US00RE38269E

(19) United States
(12) Reissued Patent
Liu

(10) Patent Number: US RE38,269 E
(45) Date of Reissued Patent: Oct. 7, 2003

(54) ENHANCEMENT OF SPEECH CODING IN BACKGROUND NOISE FOR LOW-RATE SPEECH CODER

(75) Inventor: Yu-Jih Liu, Wharton, NJ (US)

(73) Assignee: ITT Manufacturing Enterprises, Inc., Wilmington, DE (US)

(21) Appl. No.: 09/422,820

(22) Filed: Oct. 21, 1999

Related U.S. Patent Documents

Reissue of:
(64) Patent No.: 5,680,508
Issued: Oct. 21, 1997
Appl. No.: 08/060,710
Filed: May 12, 1993

(63) Continuation of application No. 07/695,571, filed on May 3, 1991, now abandoned.

(51) Int. Cl.[7] ..... G10L 21/02

(52) U.S. Cl. ..... 704/227; 704/214; 704/213; 704/208; 704/219; 704/223

(58) Field of Search ..... 704/213, 214, 704/227, 219, 207, 208, 226, 200, 201, 230, 211, 233

(56) References Cited

U.S. PATENT DOCUMENTS

| | | | | | |
|---|---|---|---|---|---|
| 4,074,069 | A | * | 2/1978 | Tokura et al. | 704/208 |
| 4,091,237 | A | * | 5/1978 | Wolnowsky et al. | 704/207 |
| 4,296,279 | A | * | 10/1981 | Stork | 704/264 |
| 4,589,131 | A | * | 5/1986 | Horvath et al. | 704/214 |
| 4,630,304 | A | * | 12/1986 | Borth et al. | 381/94.3 |
| 4,696,038 | A | * | 9/1987 | Doddington et al. | 704/219 |
| 4,720,802 | A | * | 1/1988 | Damoulakis et al. | 704/233 |
| 4,933,973 | A | * | 6/1990 | Porter | 704/233 |
| 4,975,956 | A | * | 12/1990 | Liu et al. | 704/219 |
| 5,073,940 | A | * | 12/1991 | Zinser et al. | 704/226 |
| 5,127,053 | A | * | 6/1992 | Koch | 704/207 |
| 5,459,814 | A | * | 10/1995 | Gupta et al. | 704/233 |
| 5,806,024 | A | * | 9/1998 | Ozawa | 704/222 |
| 6,018,707 | A | * | 1/2000 | Nishiguchi et al. | 704/222 |
| 6,081,776 | A | * | 6/2000 | Grabb et al. | 704/219 |

OTHER PUBLICATIONS

Rabiner et al., ("Digital Processing of Speech Signals," Prentice Hall, Upper Saddle River, NJ, pp. 130–133, 451–452, Dec. 1978).*

Deller et al., ("Discrete–Time Processing of Speech Signals," Prentice Hall, Upper Saddle River, NJ, pp. 244–251, 471–473, Dec. 1987).*

(List continued on next page.)

*Primary Examiner*—Vijay Chawan
(74) *Attorney, Agent, or Firm*—Hale and Dorr LLP

(57) ABSTRACT

A speech coding system employs measurements of robust features of speech frames whose distribution are not strongly affected by noise/levels to make voicing decisions for input speech occurring in a noisy environment. Linear programing analysis of the robust features and respective weights are used to determine an optimum linear combination of these features. The input speech vectors are matched to a vocabulary of codewords in order to select the corresponding, optimally matching codeword. Adaptive vector quantization is used in which a vocabulary of words obtained in a quiet environment is updated based upon a noise estimate of a noisy environment in which the input speech occurs, and the "noisy" vocabulary is then searched for the best match with an input speech vector. The corresponding clean codeword index is then selected for transmission and for synthesis at the receiver end. The results are better spectral reproduction and significant intelligibility enhancement over prior coding approaches. Robust features found to allow robust voicing decisions include: low-band energy; zero-crossing counts adapted for noise level; AMDF ratio (speech periodicity) measure; low-pass filtered backward correlation; low-pass filtered forward correlation; inverse-filtered backward correlation; and inverse-filtered pitch prediction gain measure.

24 Claims, 17 Drawing Sheets

OTHER PUBLICATIONS

Wolfgang Hess, ("Pitch Determination of Speech Signals", pp. 373–383, Springer–Verlag, NY, 1983).*

Siegel, ("A Procedure for Using Pattern Classification Techniques to Obtain a Voiced/Unvoiced Classifier", IEEE Transactions on Acoustics, Speech, and Signal Processing, vol. ASSP–27, No. 1, Feb. 1979).*

Chen et al., "Robust Vector Quantization Based on Spectral Mapping with a Noise Estimate", IEEE Pacific RIM Conference on Communications, Conference date: Jun. 1, 1989.

Kou et al., "Vector–Adaptive Vector Quantization with Application to Speech Coding", IEEE Transactions on Communications, vol. 39, No. 6, Jun. 1991.

* cited by examiner

ENHANCEMENT OF SPEECH CODING IN BACKGROUND NOISE FOR LOW-RATE SPEECH CODER

Matter enclosed in heavy brackets [ ] appears in the original patent but forms no part of this reissue specification; matter printed in italics indicates the additions made by reissue.

This is a continuation of application Ser. No. 07/695,571 filed May 3, 1991 now abandoned.

The United States Government has rights in this invention pursuant to RADC Contract F30602-89-C-0118 awarded by the Department of the Air Force.

FIELD OF THE INVENTION

The present invention relates to enhanced speech coding techniques for low-rate speech coders, and particularly, to improved speech frame analysis and vector quantization methods.

BACKGROUND OF THE INVENTION

A low-bit-rate speech coder is disclosed in U.S. Pat. No. 4,975,956, issued to Y. J. Liu and J. H. Rothweiler, entitled "Low-Bit-Rate Speech Coder Using LPC Data Reduction Processing", which is incorporated herein by reference. This speech coder employs linear predictive coding (LPC) analysis to generate reflection coefficients for the input speech frames and pitch and gain parameters. To obtain a low bit rate of 400 bps, these parameters are further compressed. The reflection coefficients are first converted to line spectrum frequencies (LSFs) and formants. For even frames, these spectral parameters are vector-quantized into clean codeword indices. Odd frames are omitted, and are regenerated by interpolation at the decoder end. The vector quantization module compares the spectral parameters for an input word against a vocabulary of codewords for which vector indices have been generated and stored during a training sequence, and the optimally matching codeword is selected for transmission. Pitch and gain bits are quantized using trellis coding. Output speech is reconstructed from the regenerated vector-quantization indices using a matching codebook at the decoder end.

In a quiet background, this 400-bps speech coder has a high intelligibility for a low-bit-rate transmission. However, in a background of high noise, such as in a helicopter or jet, the encoded speech becomes unintelligible. A detailed study has shown that conversion of voicing and spectral parameters in the high-noise environment is the key to the loss of intelligibility. The LPC conversion causes a majority of voiced frames to become unvoiced. The result is a whispering LPC speech and an almost inaudible low-rate voice. Even if the voicing is correct, spectral distortion causes the low-rate voice to be significantly muffled and buzzy. Although the pitch has no audible errors, the gain has a predominantly annoying effect.

SUMMARY OF INVENTION

It is therefore a principal object of the invention to provide an improved low-bit-rate speech coder capable of high quality speech coding in a high-noise environment. In accordance with the invention, a two-step approach to conversion of voicing and spectral parameters is taken. In the first step, robust speech frame features whose distributions are not strongly affected by noise levels are generated. In the second step, linear programming is used to determine an optimum combination of these features. A technique of adaptive vector quantization is also used in which a clean codebook is updated based upon an estimate of the background noise levels, and the "noisy" codebook is then searched for the best match with an input speech vector. The corresponding clean codeword is then selected for transmission and for synthesis at the receiver end. The results are better spectral reproduction and significant intelligibility enhancement over the previous coding approach.

In a preferred implementation of the system for the environment of helicopter, it is found that the following features are well distributed to allow good discrimination between voiced and unvoiced speech: (1) low-band energy; (2) zero-crossing counts adapted for noise level; (3) AMDF ratio (speech periodicity) measure; (4) low-pass filtered, backward correlation; (5) low-pass filtered, forward correlation; (6) inverse-filtered backward correlation; and (7) inverse-filtered pitch prediction gain measure. By linear programming analysis, five of these robust features are determined to significantly improve voicing decisions in the speech coder system. Adaptive vector quantization, using estimates of the average noise amplitude and average noise reflection coefficients to update codebook vectors, significantly improves input vector matching.

BRIEF DESCRIPTION OF DRAWINGS

The above principles and further features and advantages of the invention are described in detail below in conjunction with the drawings, of which.

DETAILED DESCRIPTION OF PREFERRED EMBODIMENTS

Figure 1:
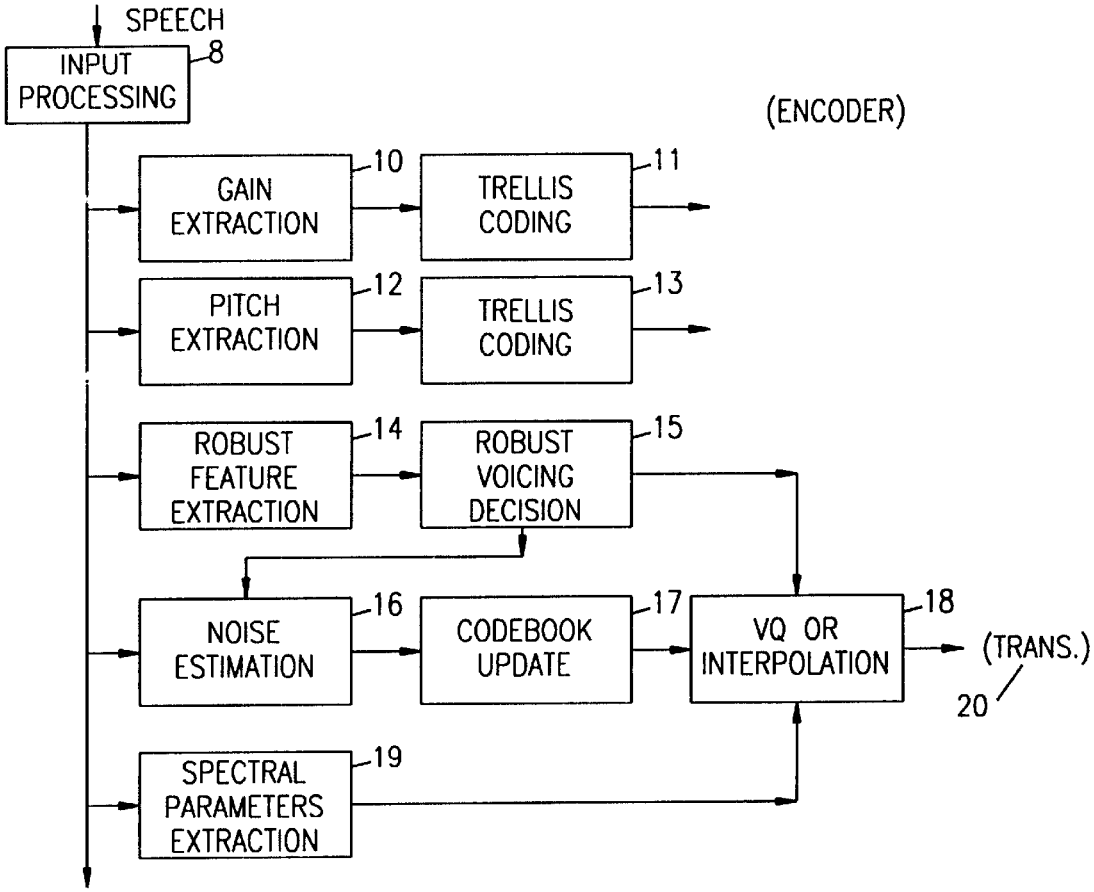
FIG. 1 is a block diagram of the component steps of the encoding side of a speech coder system in accordance with the invention.

Referring to FIG. 1, a block diagram of an encoding sequence in accordance with the present invention illustrates the processing of input speech frames. The encoding processing is basically similar to that used in the aforementioned U.S. Pat. No. 4,975,956. The LPC features are generated for each speech frame as an input processing step (8). The gain and pitch parameters are extracted (10, 12) and converted to gain and pitch bits by trellis coding (11, 13). LPC spectral parameters are extracted (19) and converted to line spectrum frequencies (LSPs) and formants for the subsequent vector quantization and/or interpolation (VQ/I) step (18) in a low-bit-rate transmission. The main differences are in the employment of robust LPC feature extraction and voicing decision (14, 15), noise estimation (16), and updating of a clean codebook (17), in order to provide better spectral representation and codeword matching for input speech in a noisy environment. Upon optimal "noisy" codeword matching, the corresponding "clean" codeword indices are then transmitted (20).

Figure 2:
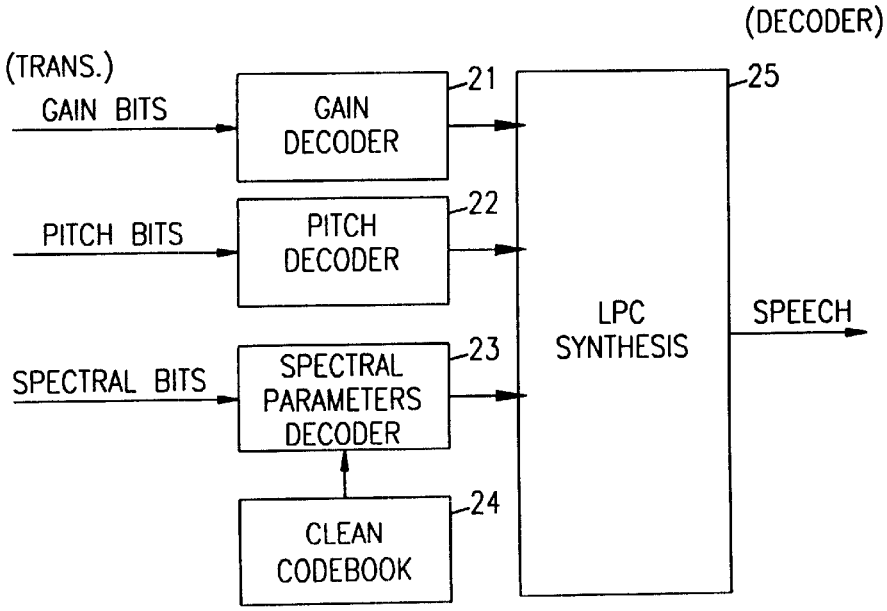
FIG. 2 is a block diagram of the component steps of the decoding side of the speech coder system.

In FIG. 2, the decoding sequence of the speech coder system is shown having the usual operations as disclosed in U.S. Pat. No. 4,975,956. The gain and pitch bits are decoded (21, 22) using the reverse process of the encoding method. The transmitted spectral bits of the "clean" codewords are decoded to LSP parameters (23) using a "clean" codebook (24). The decoded parameters are then converted to LPC format (25) and synthesized to output speech.

To identify speech parameters crucial for intelligibility in a high-noise environment, such as helicopter noise, several listening tests were performed comparing the performance of a clean speech file with a noisy speech file through LPC analysis. The listening tests showed that the voicing and spectrum parameters of LPC conversion must be enhanced to obtain intelligible speech coding. Also, the gain parameter requires correction to eliminate an annoying noise effect.

In the following preferred embodiments of the invention, enhanced techniques for low-bit-rate coding are applied to a 400-bps speech coder in the environment of helicopter noise. However, the principles of the invention illustrated herein are applicable for other low bit rates of transmission and to other types of noisy environments as well.

To achieve the low bit rate of 400 bps, spectral parameters are not quantized with every speech frame. As described in the aforementioned U.S. Pat. No. 4,975,956, vector quantization is performed for every even frame, while interpolation is performed for every odd frame. For the odd frame, interpolation bits are sent representing an interpolation factor used for the combination of the spectral codeword of its previous frame and future frame. Based upon a frame period of 22.5 msec used in a standard encoder, the preferred bit allocations are illustrated in Table I.

TABLE I

| Parameter | Even Frame | Odd Frame | Two Frames |
|---|---|---|---|
| Spectral | 10 | 0 | 10 |
| Gain | 2 | 2 | 4 |
| Pitch | 1 | 1 | 2 |
| Interpolation | 0 | 2 | 2 |
| Total: | 13 | 5 | 18 |

For even frames, a total of 13 bits are allocated. For odd frames, only 5 bits are allocated. For every pair of even and odd frames, a total of 18 bits are used. Assuming a 45 msec period for every two frames, this bit allocation scheme fits within the 400 bits/second requirement.

The major operations for obtaining robust voicing decisions include preliminary processing, robust feature extraction, voicing classification, and voicing smoothing. The specific parameters of these processing steps depend upon the different applications and environments. In the described example, voicing decisions are made every half frame or 11.25 msec. To enable robust voicing decisions, feature distributions without strong dependence on noise levels are necessary. The selected features are then combined using optimum weights in a linear combination.

Figure 3:
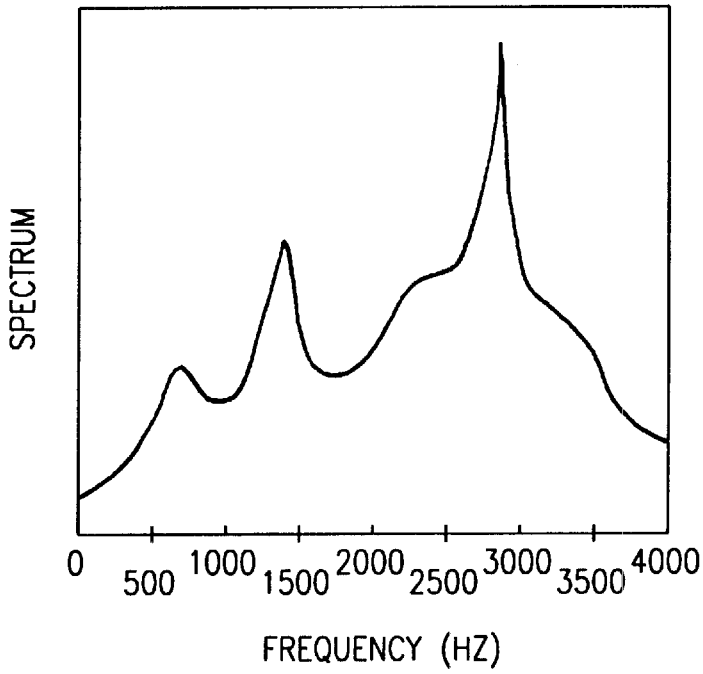
FIG. 3 is a spectral plot of a typical spectrum of a noisy background, i.e., helicopter noise.

Following the usual operations in LPC analysis, the preliminary processing includes high-pass filtering, voicing-window decisions, and low-pass filtering. The low-pass filtering is particularly important for robust voicing decisions in a high noise environment. Even though real-world noise, such as helicopter noise, is usually distributed in characteristic patterns, the spectral strength is normally weak in the low frequency band. A typical spectrum of helicopter noise is shown in FIG. 3 with three salient formants. However, the noise components tend to be weaker below 500 Hz. Therefore, if the cut-off frequency of the low-pass filter is set below 500 Hz, a majority of noise energy is rejected. The high-pass filter is set at a frequency cutoff, such as 100 Hz, which eliminates low frequency background transients and mechanical noise.

Voicing decisions are the determination of fundamental periodicity in the input speech. For human speech, the fundamental frequency is usually below 400 Hz. Therefore, a good choice of the cut-off frequency is about 420 Hz. Using the Remetez exchange algorithm, a low-pass filter with cut-off frequency at 420 Hz and transition frequency at 650 Hz is used. This filter is selected to be even-symmetric with 40 taps. Typical values for the first 20 taps, $h_k$, k=0, . . . 19, are illustrated in Table II.

TABLE II

| Tap | Value |
|---|---|
| $h_0$ | 0.01787624 |
| $h_1$ | 0.02237480 |
| $h_2$ | 0.002685766 |
| $h_3$ | 0.01303141 |
| $h_4$ | −0.0001381086 |
| $h_5$ | −0.001044893 |
| $h_6$ | −0.01218479 |
| $h_7$ | −0.01683313 |
| $h_8$ | −0.02370618 |
| $h_9$ | −0.02454394 |
| $h_{10}$ | −0.02252495 |
| $h_{11}$ | −0.01385341 |
| $h_{12}$ | −0.003387984 |
| $h_{13}$ | 0.01871256 |

TABLE II-continued

| Tap | Value |
|---|---|
| $h_{14}$ | 0.04112903 |
| $h_{15}$ | 0.0654924 |
| $h_{16}$ | 0.08902424 |
| $h_{17}$ | 0.109489 |
| $h_{18}$ | 0.124534 |
| $h_{19}$ | 0.132543 |

The next 20 tap values are determined from symmetry and are given as follows:

$$h_{39-n}=h_m n=0_1 \ldots 19$$

All the features are extracted in the low-frequency band to minimize the noise corruption. The filtered speech can be computed as follows, where the input speech after high-pass filtering is $s_n$:

$$l_n = \sum_{i=0}^{19} h_k (s_{n-k} + s_{n+k-39})$$

Figure 4:
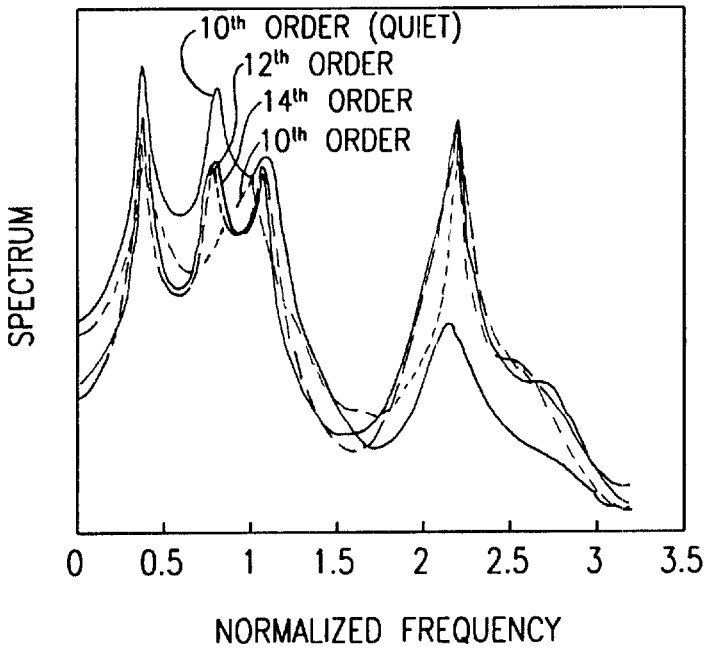
FIG. 4 is a spectral plot of typical LPC spectrums comparing different orders of LPC analysis in a noisy environment to a quiet environment.

A spectral plot of the effect of the low-pass filter is illustrated in FIG. 4 for various LPC orders (10th, 12th, 14th) for a helicopter noise environment, as compared to an input of 10th LPC order in a quiet environment. In a quiet background, the 10th order LPC analysis (solid line) usually generates a good spectral contour. However, as the noise level increases, the 10th order analysis becomes insufficient for reliable spectral representation. The peak from the helicopter noise in the high-frequency band is clearly visible. In the low-frequency band, three dominant formants are visible for the 14th and 12th order LPC analysis, whereas the third formant for the 10th order spectrum is missing. Based upon this evaluation, it is determined that higher-order LPC analysis is clearly preferred for a noisy environment, and therefore, a 14th order LPC analysis is selected herein.

Two major criteria for good robust features are that their distributions must not strongly depend upon noise levels and that they must have good voiced/unvoiced discrimination. Speech samples were evaluated for male and female speakers in a quiet environment with a signal-to-noise ratio of 30 dB, and in a noisy environment with a signal-to-noise ratio of −10 dB. Robust features were then selected on the basis of both low-frequency distributions and voiced/unvoiced discriminations, using low-band energy measurements, zero-crossing rate, and selected correlation calculations as factors. The processing steps for the enhancement techniques of the present invention, including extraction of the robust features, their use for robust voicing decisions, noise estimation, and updating a clean codebook, are illustrated in the block diagram of FIG. 5.

Low-band energy distribution is a measure of energy in the low-frequency band. Typically, voiced speech has higher low-band energy than unvoiced speech. For normalization purposes, this energy is divided by the average voiced energy, as represented by the following equation, wherein 1 represents the speech signal after 100 Hz high-pass filtering and 420 Hz low-pass filtering, and LEA represents the average voiced energy in the low band:

$$LE = \frac{\Sigma R_i l}{LEA}$$

Figure 6:
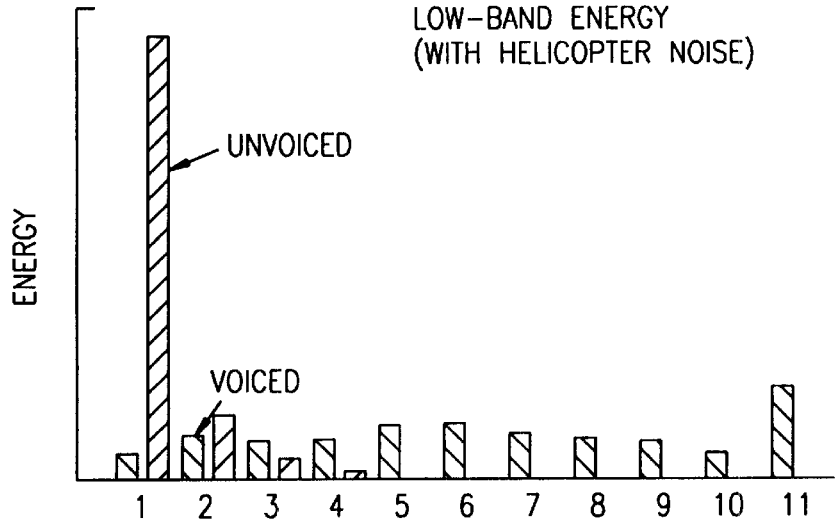
FIGS. 6, 7 and 8 are plots of the low-band energy for input in a noisy environment at a 400 Hz bandwidth, a quiet environment, and a noisy environment at 800 Hz bandwidth, which demonstrates selection of a robust feature for extraction in accordance with the invention.
Figure 7:
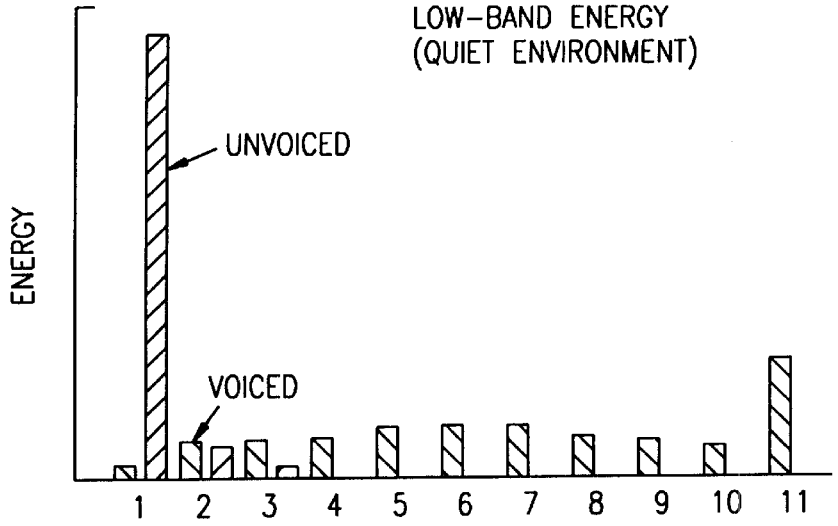
Figure 8:
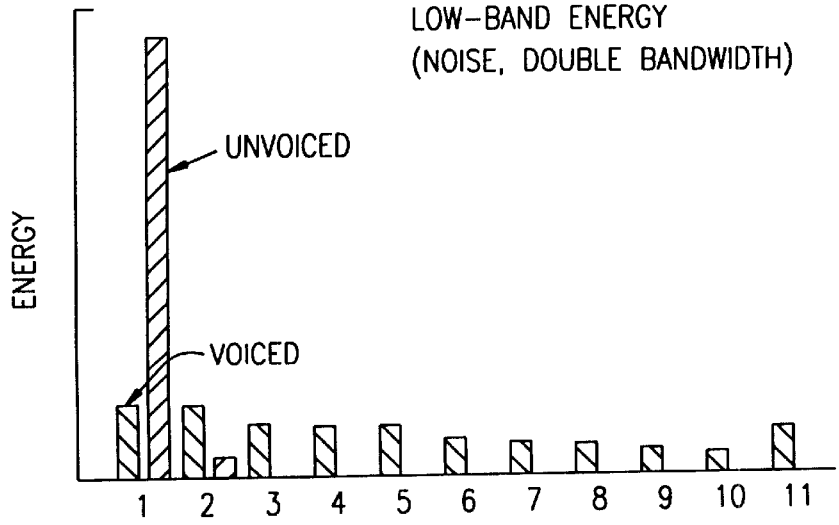

FIG. 6 illustrates a histogram of low-band energy with helicopter noise at S/N=−10 dB, FIG. 7 illustrates low-band energy in a quiet background, and FIG. 8 illustrates low-band energy with twice the bandwidth (i.e., increased to 800 Hz) with helicopter noise at S/N=−10 dB. FIGS. 6 and 7 show similar distributions. For unvoiced speech, the energy distributions are mainly at bin (frequency band) 1. For voiced speech, the distributions are spread over all bins, but with little overlap with the unvoiced bins. A comparison of FIGS. 6 and 8 shows that discrimination is clearly better using the lower bandwidth, since the voiced distribution is reduced at bin 1, where the unvoiced distribution dominates, and increased at bin 11, where the unvoiced distribution is minimal. On the basis of this evaluation, the lower bandwidth of 400 Hz is selected for robust feature extraction.

Another feature found to have robustness for good voicing decisions is measurement of the zero-crossing rate, i.e., the number of times the input signal crosses a zero (or reference) axis. In effect, it is a count of the high frequency content in the signal. Typically, unvoiced speech has a higher zero-crossing count than voiced speech. The zero-crossing count is accumulated by counting changes in sign of $1_n$, which is defined as positive if $1_n > \pm D$, and negative if $1_n < \pm D$.

To make the zero-crossing count robust in a noisy environment, it is counted in the low-frequency band, and the dither D is appropriately adjusted in noise. The low-band energy is computed according to the following equation:

$$E=\Sigma(1_n)^2$$

For the jth frame, this energy is indicated by $E_j$. The low-band noise energy is first estimated by assuming there are always available 16 frames without speech activity. Using these 16 frames, the average low-band noise energy $E^N$ is computed as:

$$E_j^N=(1-1/j)E_{j-1}^N+(1/j)E_j$$

$$j=1, \ldots, M=16$$

After these 16 frames, the low-band noise energy is updated at frame k if three conditions are satisfied. First, this frame must be unvoiced. Second, there must already be an accumulation of 16 continuous unvoiced frames before this current frame. Third, the ratio of current low-band energy to average low-band noise energy is less than 1.6. If all three conditions are satisfied at frame k, the average low-band noise energy is updated as follows:

$$E^N_k=(63/64)E^N_{k-1}+(1/64)E_k$$

To adapt the coefficient D to noise, a quantity a is defined as follows:

$$a=E^N_k/7+1$$

After evaluating a, a minimum between a and 20 is selected. Next, the quantity b, which is the maximum between the selected minimum and 10 is obtained. Mathematically, b is given by the following equation:

$$b=\max[\min(a, 20), 10]$$

where max represents the maximum and min represents the minimum. The adaptation coefficient D is updated as follows:

$$D=b, \text{ if } E_k/E^N_k<1.6$$

$$D=b/2, \text{ if } E_k/E^N_k>1.6$$

Figure 9:
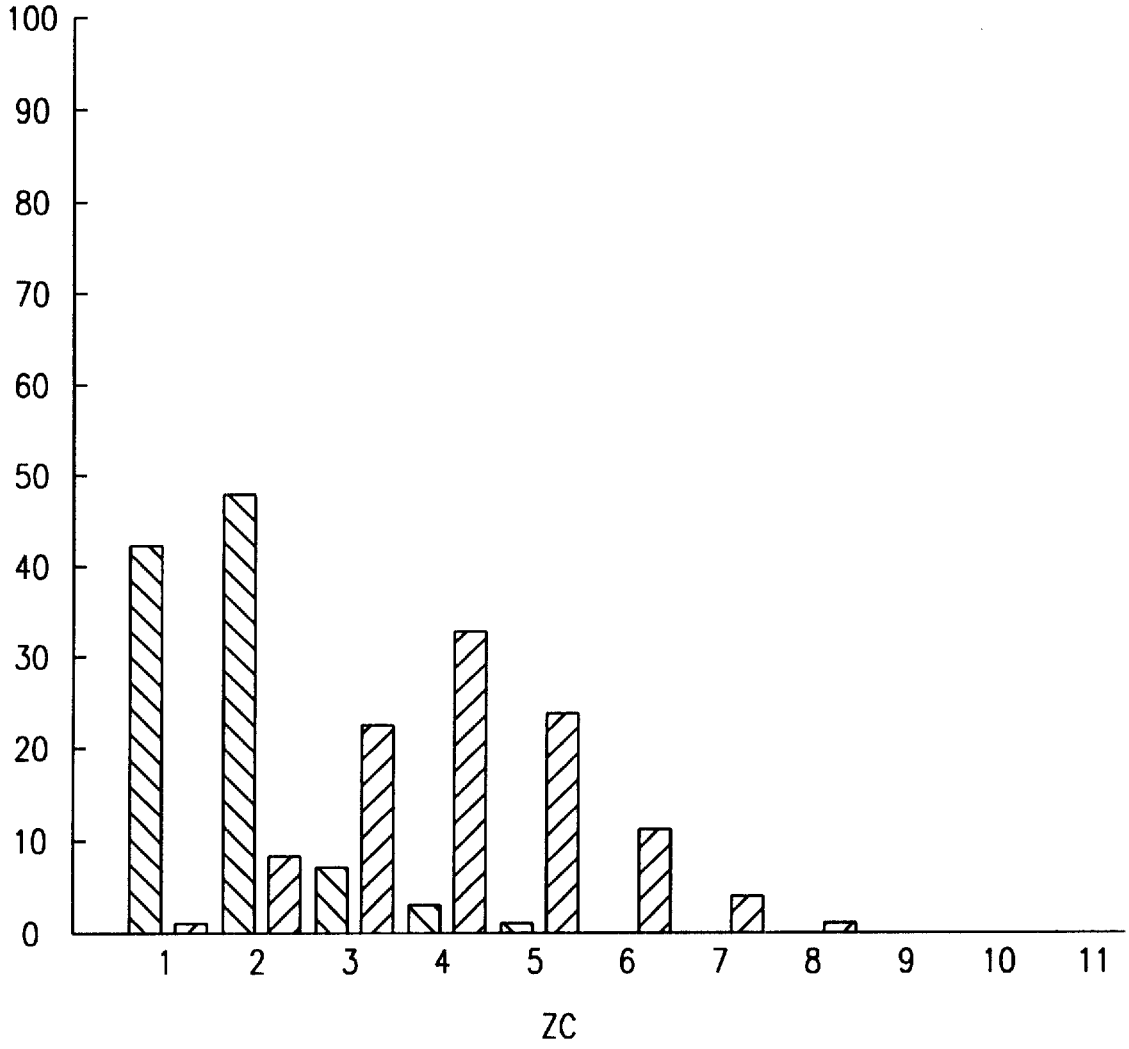
FIGS. 9 and 10 are plots of the distribution of zero-crossing counts for input with and without helicopter noise, which demonstrates selection of another robust feature for robust voicing decisions in the invention.
Figure 10:
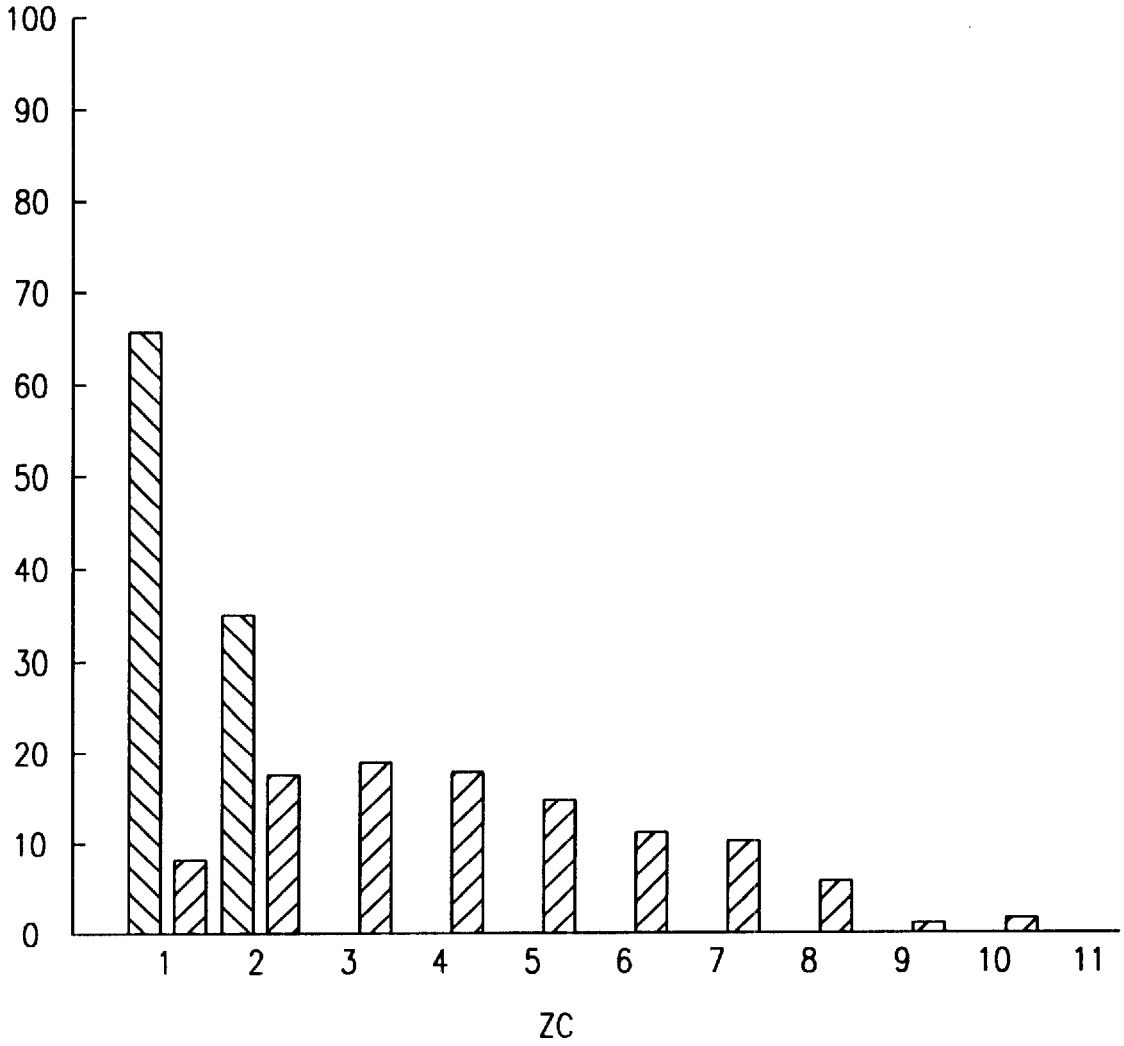

The newest value of D for frame k is then used to compute the sign of every low-pass filtered sample. The zero-crossing count then follows the procedure mentioned above. The performance of the zero-crossing count is indicated in FIG. 9 for input with helicopter noise and FIG. 10 without helicopter noise. For voiced speech, the distributions are mainly below bin 2. For unvoiced speech, the distributions are mainly above bin 3. Therefore, the zero-crossing feature has not only good discriminations but also robust distributions.

Figure 11:
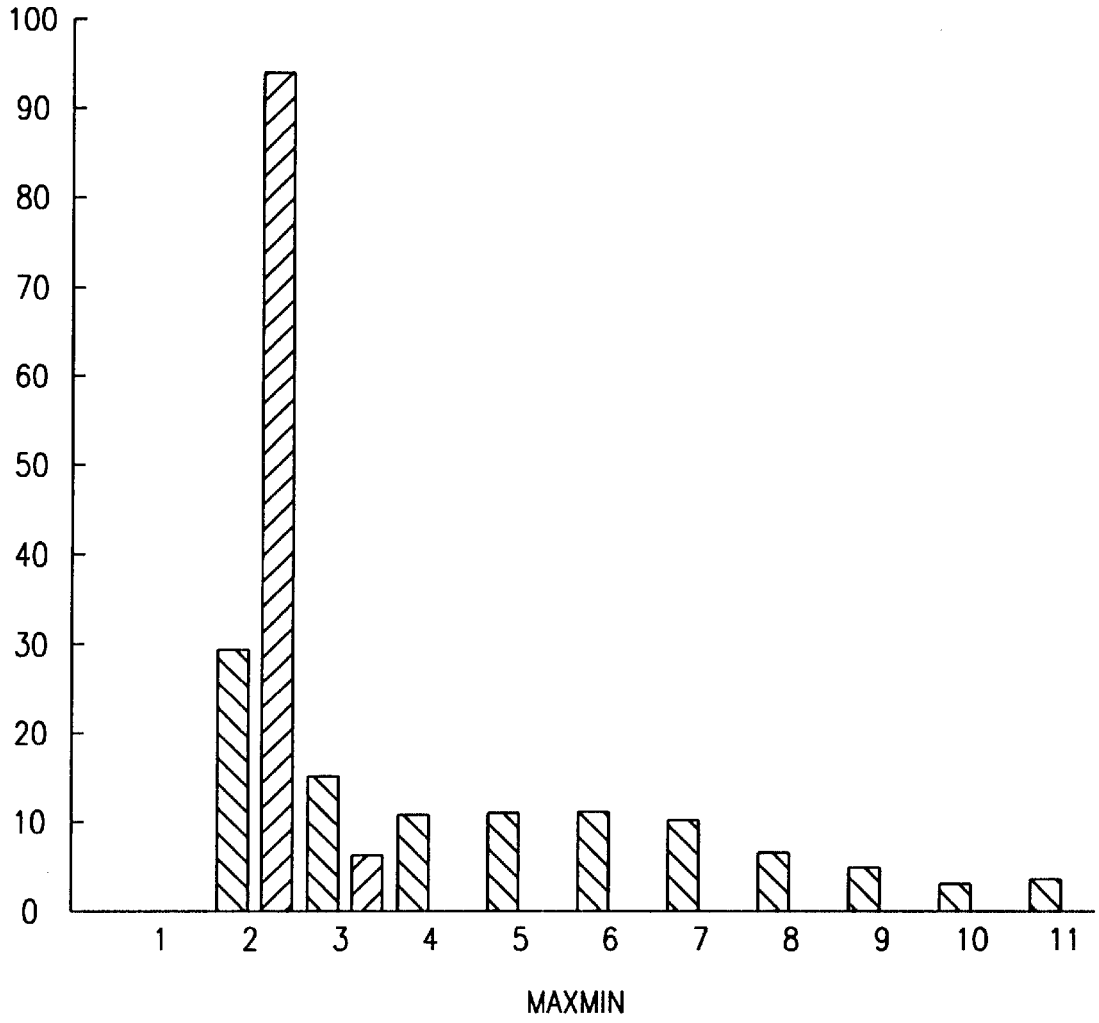
FIGS. 11 and 12 are histograms demonstrating the performance of the AMDF ratio (speech periodicity) measure with helicopter noise and without helicopter noise, respectively, as another robust feature for robust voicing decisions.
Figure 12:
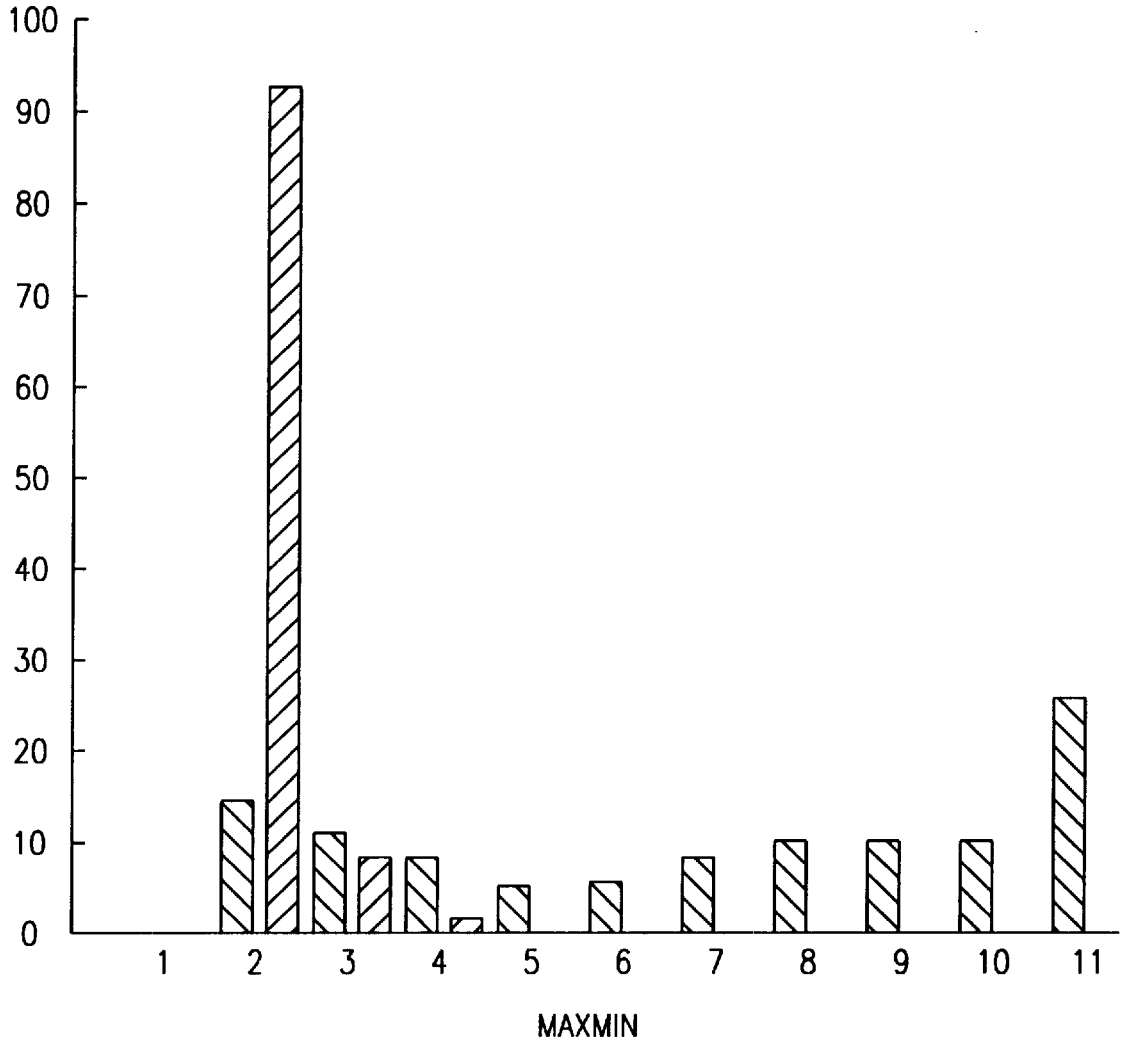

Another feature found to have robustness for speech coding in a noisy environment is a measure of periodicity of speech, referred to herein as AMDF measure. Typically, voiced speech has smaller AMDF values than unvoiced speech. The AMDF computation is done using inverse-filtered speech by passing the low-pass signal through a second-order LPC filter. If $v_i$ represents the inverse-filtered speech sample, the AMDF value is computed as follows:

$$AMDF=\Sigma|v_i-v_{i+\tau}|$$

where τ represents the 60 possible pitch lags ranging from 20 samples to 156 samples. These 60 possible lags are searched to find a maximum and a minimum. This feature is then computed as the ratio of maximum AMDF to minimum AMDF, i.e., R=max(AMDF)/min(AMDF). The performance of the AMDF ratio measure is demonstrated in FIG. 11 with helicopter noise and in FIG. 12 without helicopter noise. For voiced speech, the distributions are scattered throughout all bins. There is only a slight overlap with unvoiced speech at bin 2. Both histograms are also quite similar without a strong dependence on noise, and thus demonstrates this to be another robust feature.

Figure 13:
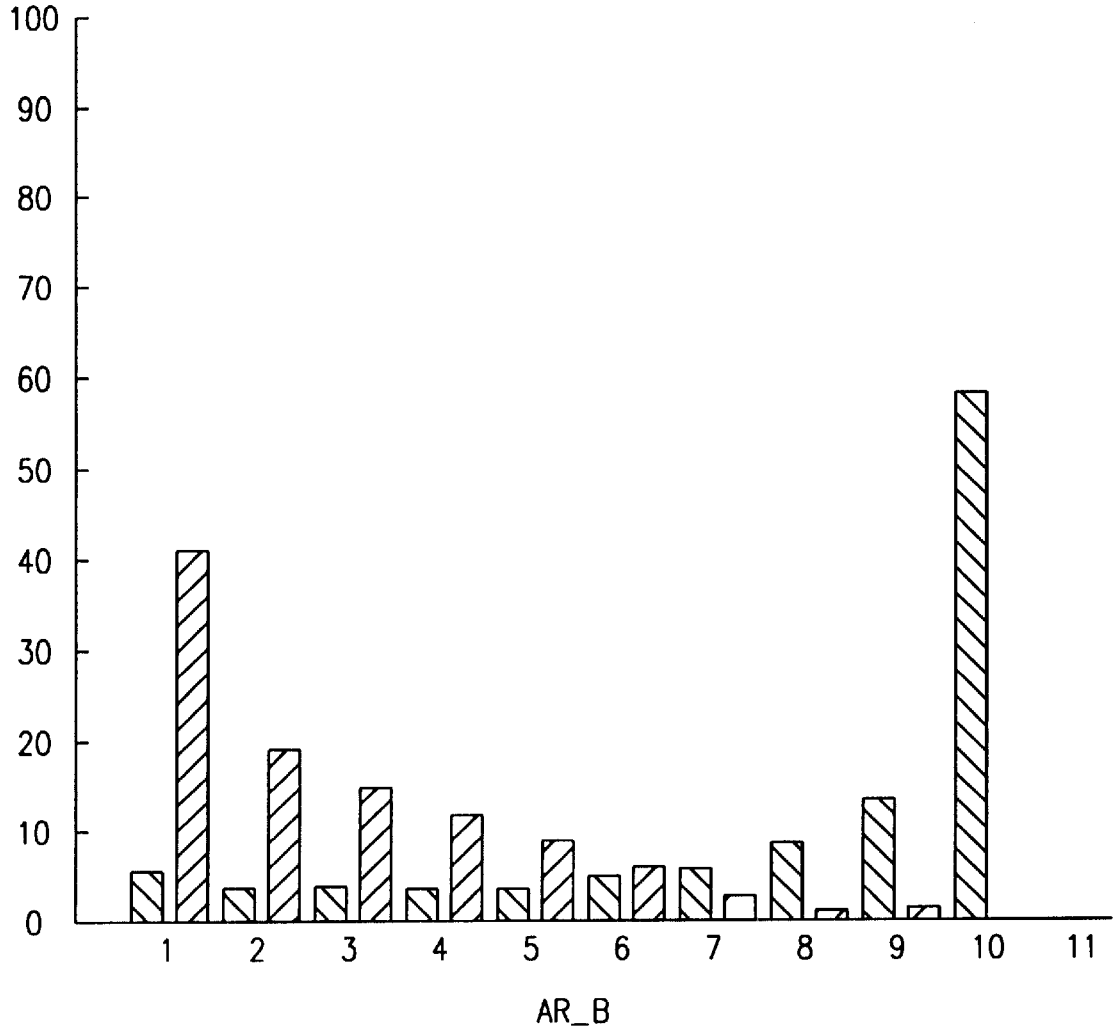
FIGS. 13 and 14 are histograms demonstrating the performance of the low-pass filtered, backward correlations measure with helicopter noise and without helicopter noise, respectively, as another feature for robust voicing decisions.
Figure 14:
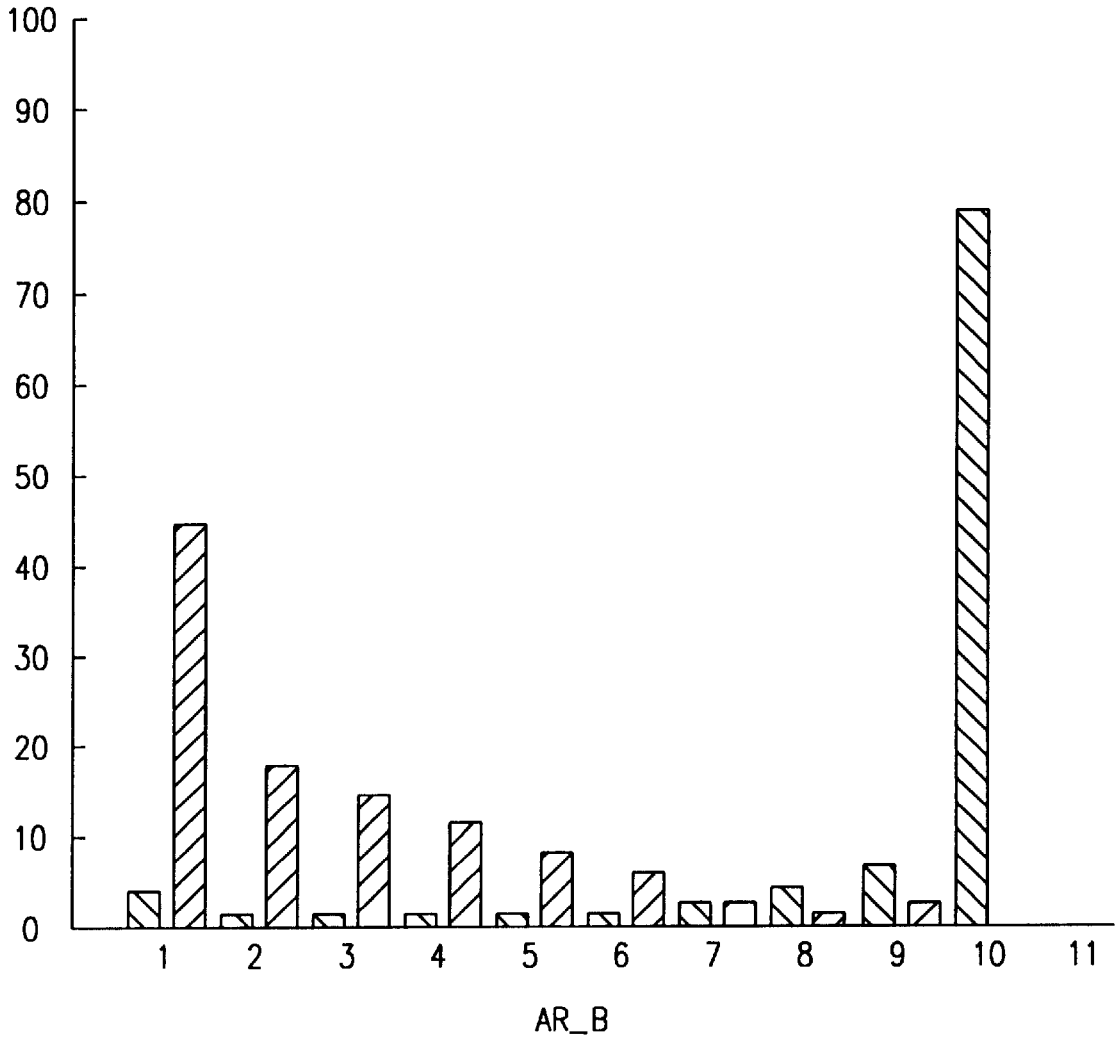

A fourth robust feature for voicing decisions in speech coding is a measure of correlation strength at the pitch period, which is a low-pass filtered backward correlation. Typically, voiced speech has higher correlation values than unvoiced speech. However, the correlation is done using negative pitch lags, and is defined mathematically as follows:

$$R^b = \frac{(\Sigma l_i l_{i-\tau})^2}{\Sigma l_i^2 \Sigma_{i-\tau}^2}$$

where τ represents the pitch period. The above equation shows this feature normalized with respect to low-pass energy with and without negative pitch lag. The performance of this feature is demonstrated in FIG. 13 with helicopter noise and in FIG. 14 without helicopter noise. For both figures, the voiced speech has values predominantly at bin 10 while the unvoiced speech has values below bin 6. Thus, the distributions in both figures are very similar and have good discrimination between voiced and unvoiced speech, and this feature demonstrates the necessary robustness for allowing enhanced voicing decisions.

Figure 15:
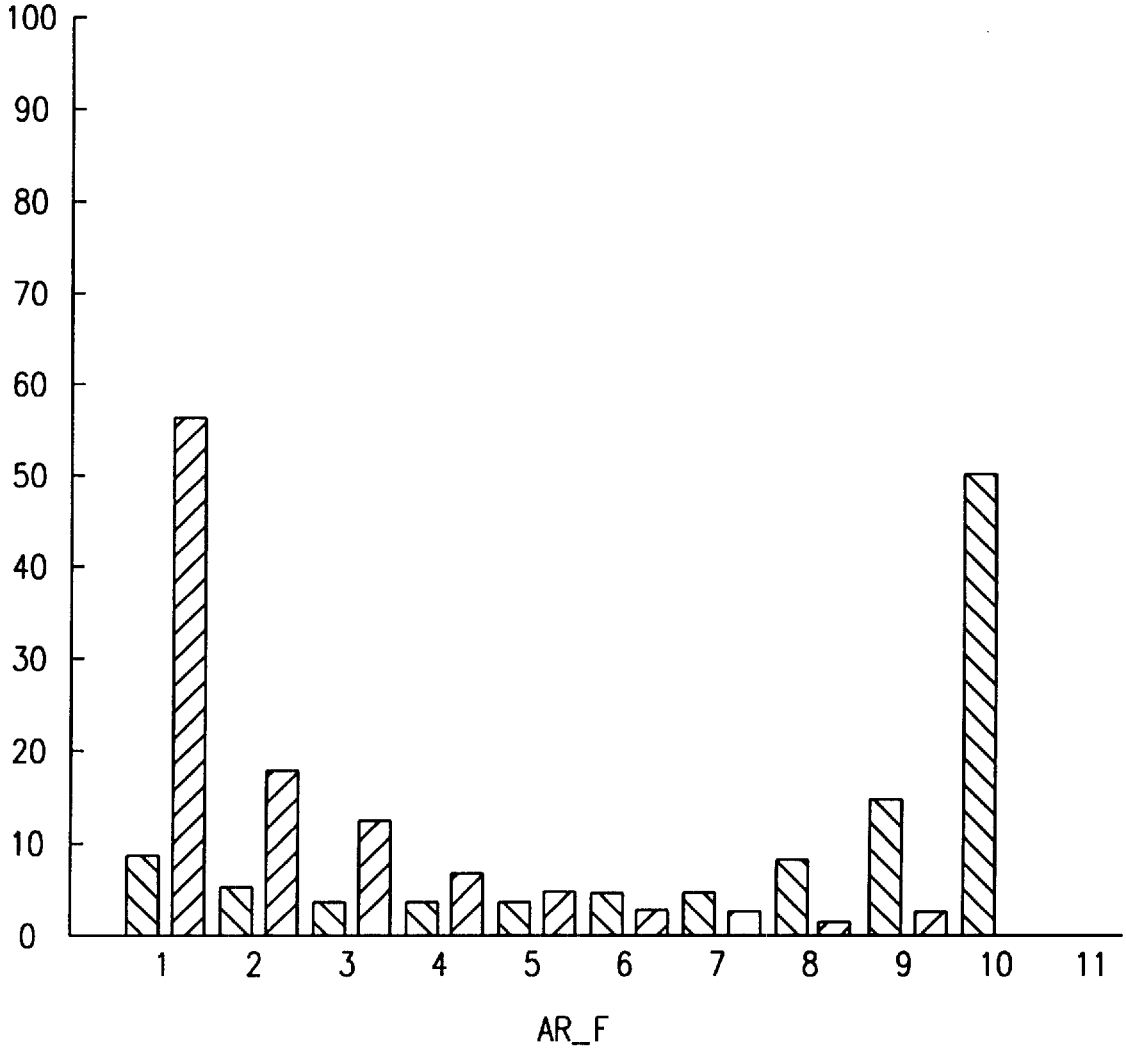
FIGS. 15 and 16 are histograms demonstrating the performance of the low-pass filtered, forward correlations measure with helicopter noise and without helicopter noise, respectively, as another feature for robust voicing decisions.
Figure 16:
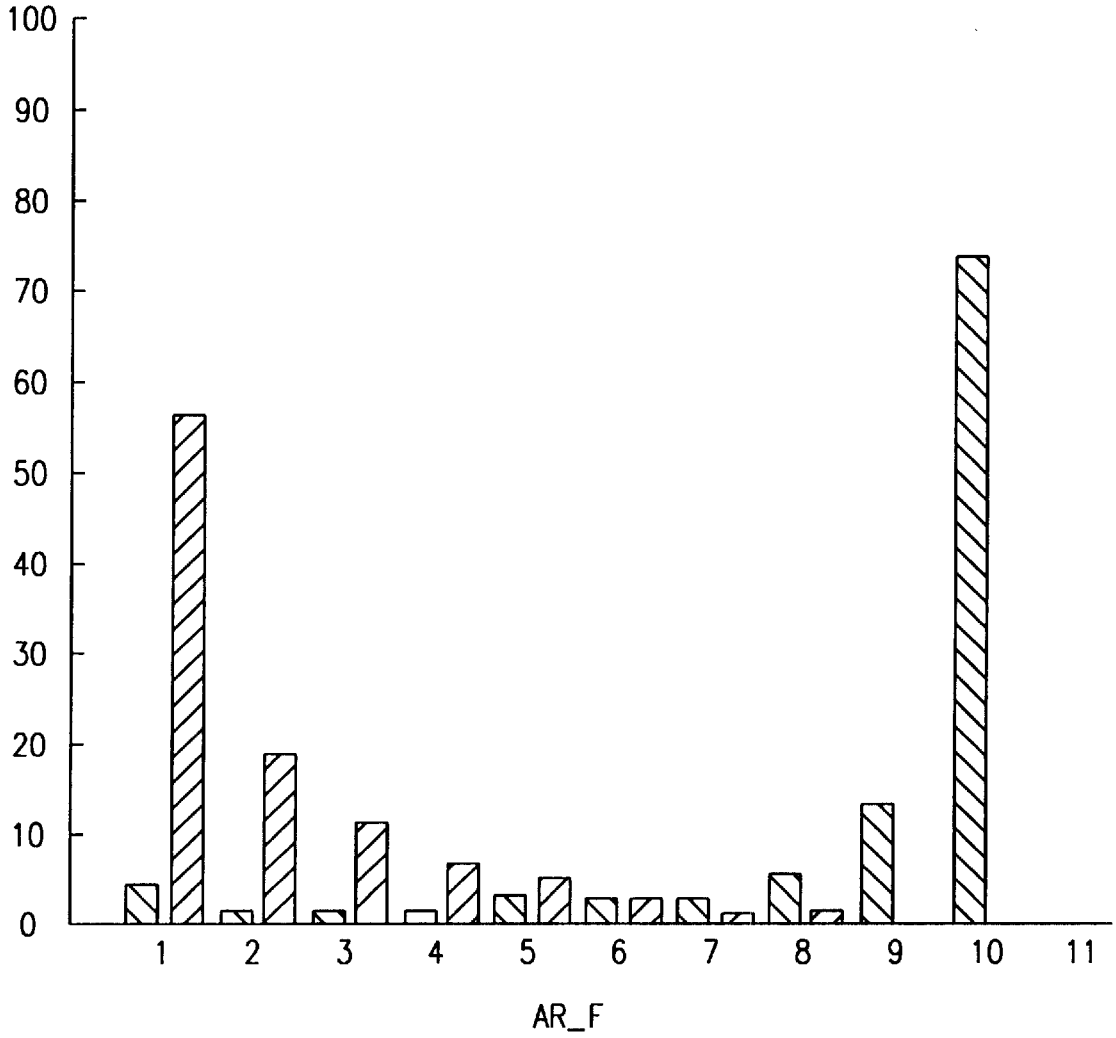

A fifth robust feature for voicing decisions is a measure of correlation strength via low-pass filtered forward correlation using a positive pitch lag. Typically, the voiced speech has higher correlation values than unvoiced speech. It is defined mathematically as follows:

$$R^f = \frac{(\Sigma l_i l_{i+\tau})^2}{\Sigma l_i^2 \Sigma_{i+\tau}^2}$$

where τ represents the pitch period. The above equation shows this feature normalized with respect to low-pass energy with and without positive pitch lag. The performance of this feature is demonstrated in FIG. 15 with helicopter noise and in FIG. 16 without helicopter noise. Both distributions and discriminations show similar characteristics as the backward correlations.

Figure 17:
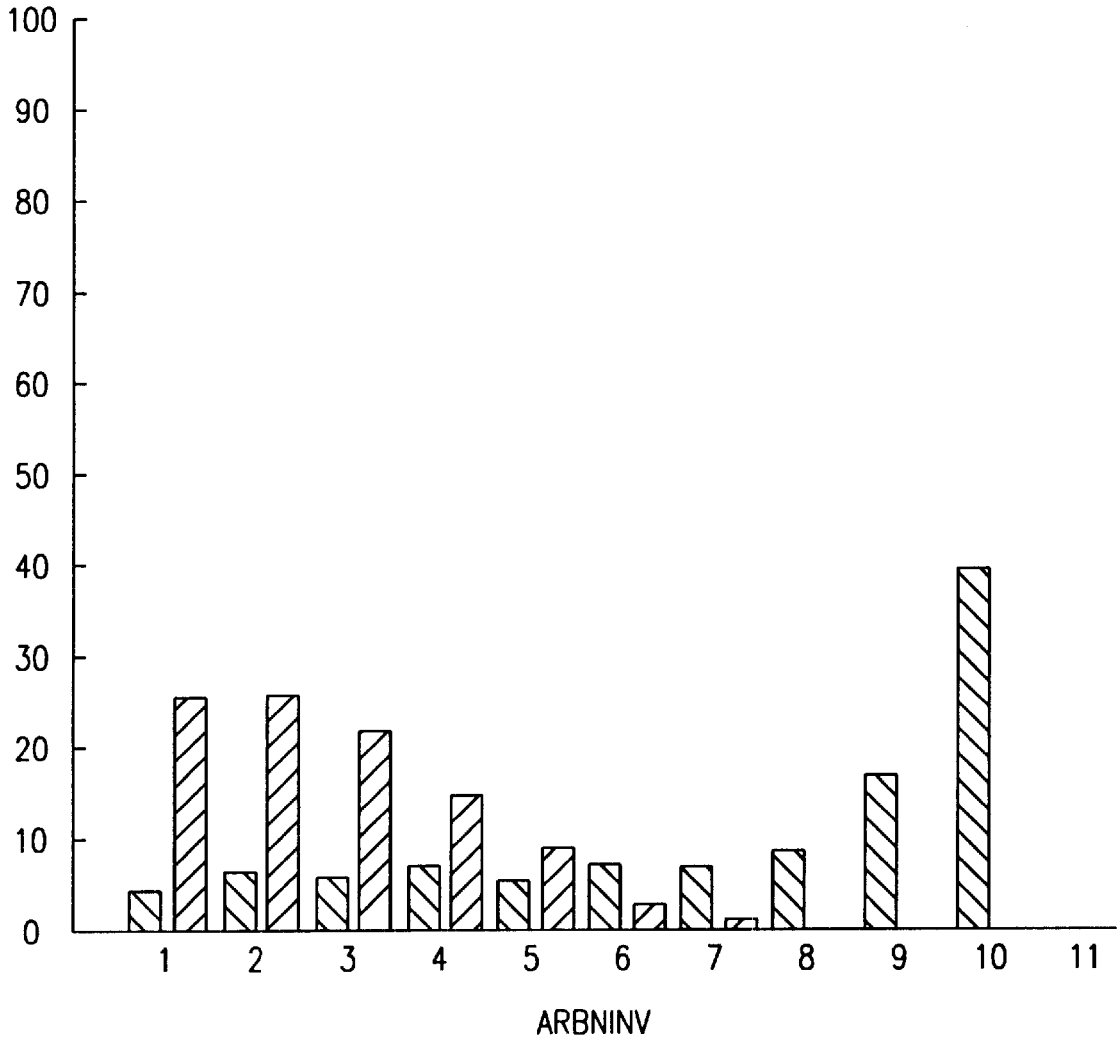
FIGS. 17 and 18 are histograms demonstrating the performance of the inverse-filtered backward correlations measure with helicopter noise and without helicopter noise, respectively, as another feature for robust voicing decisions.
Figure 18:
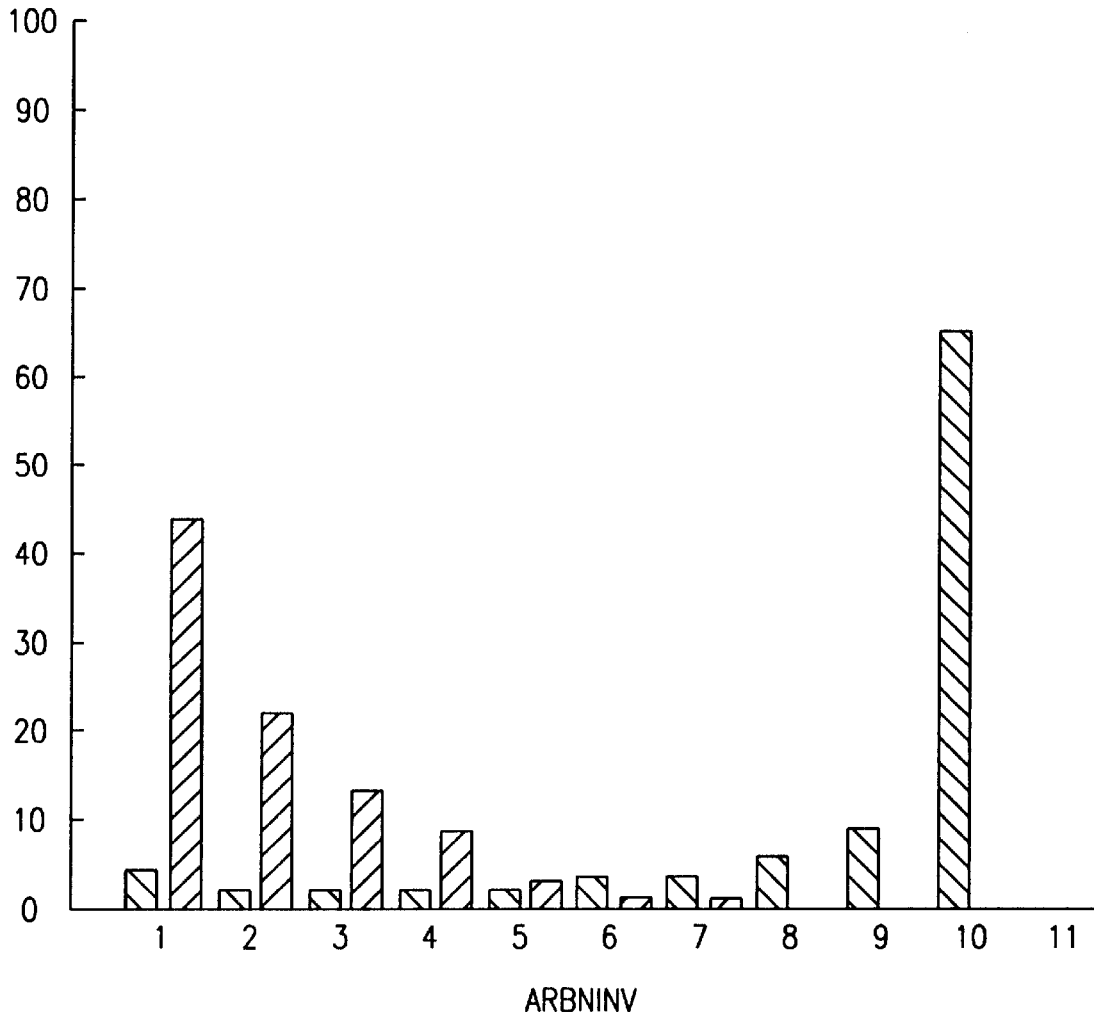

Another feature is an inverse-filtered backward correlation, which is also a measure of correlation strength at the pitch period using backward pitch lag. The main difference from the two previous correlation measures is the use of inverse-filtered speech $v_i$. Again, the voiced speech has higher correlation values than unvoiced speech. It is defined mathematically as follows:

$$R^{1b} = \frac{(\Sigma v_i v_{i-\tau})^2}{\Sigma v_i^2 \Sigma v_{i-\tau}}$$

where τ represents the pitch period. Normalization is done the same way as before with and without pitch lag. The performance of this feature is demonstrated in FIG. 17 with helicopter noise and in FIG. 18 without helicopter noise. For voiced speech, the distributions concentrate mainly at bins 9 and 10. For unvoiced speech, the distributions are scattered throughout all bins but with very little overlap with voiced bins. Thus, this feature is also suitable for enhancing voicing decisions.

Another feature found to have robustness for voicing decisions is the second-order pitch-prediction gain after inverse filtering, which is also a measure of speech periodicity). The pitch-prediction residual is given by the following equation:

$$\delta=\Sigma(\xi_n-a_1 v_{n-\tau+1}-a_2\xi_{n-\tau})^2$$

where $a_1$ and $a_2$ are prediction coefficients. The optimum prediction coefficients can be found by differentiating δ with respect to both $a_1$ and $a_2$. Substituting these two optimum values into the above equation, the optimum prediction residual is expressed as follows:

$$\delta = E\left(1 - \frac{R_{e-1}^2 - R_\tau^2 - 2R_1 R_{\tau-1} RC}{1 - R_1^2}\right)$$

where E represents the zeroth-order autocorrelation coefficient and R represents the normalized autocorrelation coefficients. The second term in the above equation is the prediction gain. The feature used for voicing decisions is slightly modified by rearranging the above equation as follows:

$$g=R_1^2+R_{\tau-1}^2+R_\tau^2-2R_1R_{\tau-1}R_\tau$$

Figure 19:
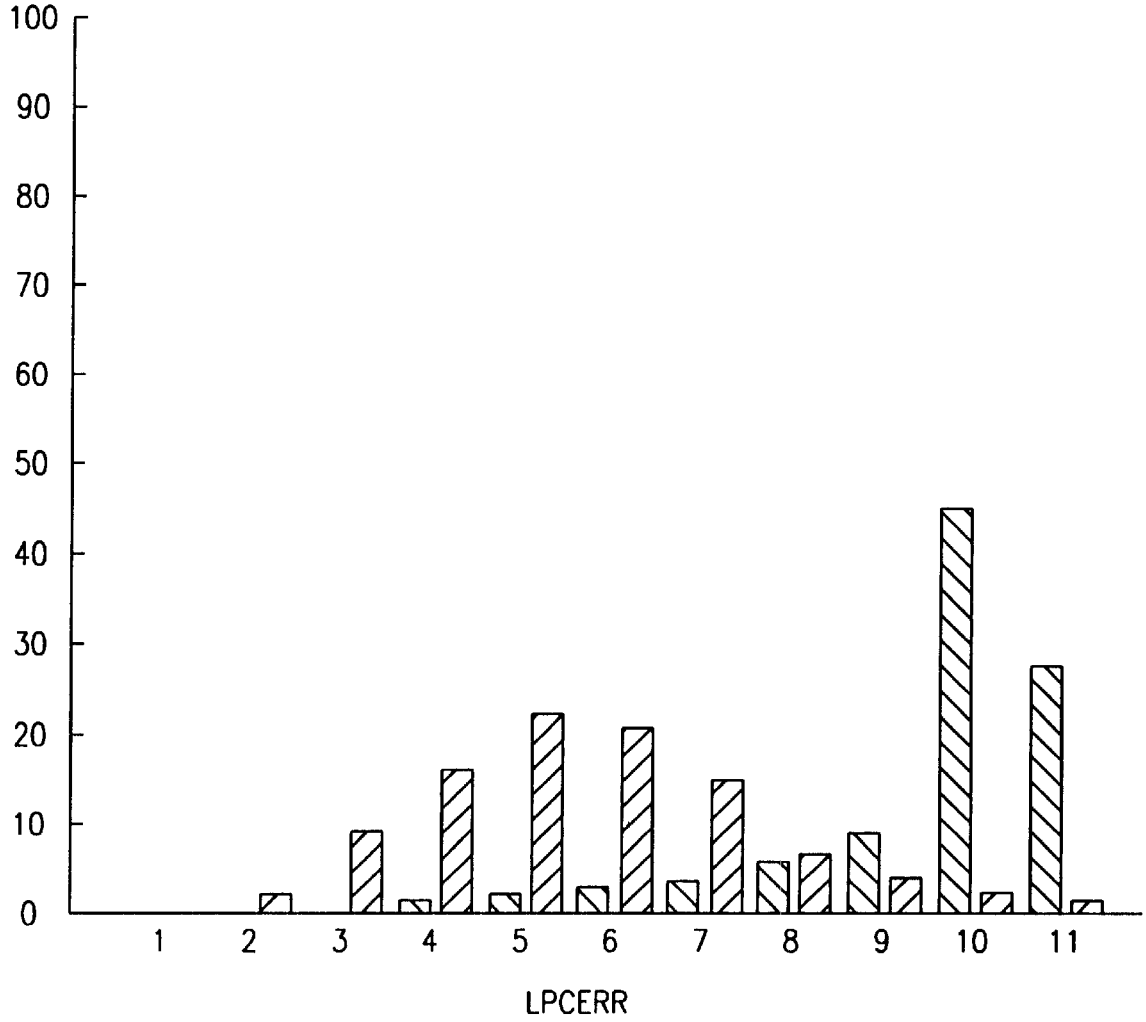
FIGS. 19 and 20 are histograms demonstrating the performance of the inverse-filtered pitch prediction gain measure with helicopter noise and without helicopter noise, respectively, as another feature for robust voicing decisions.
Figure 20:
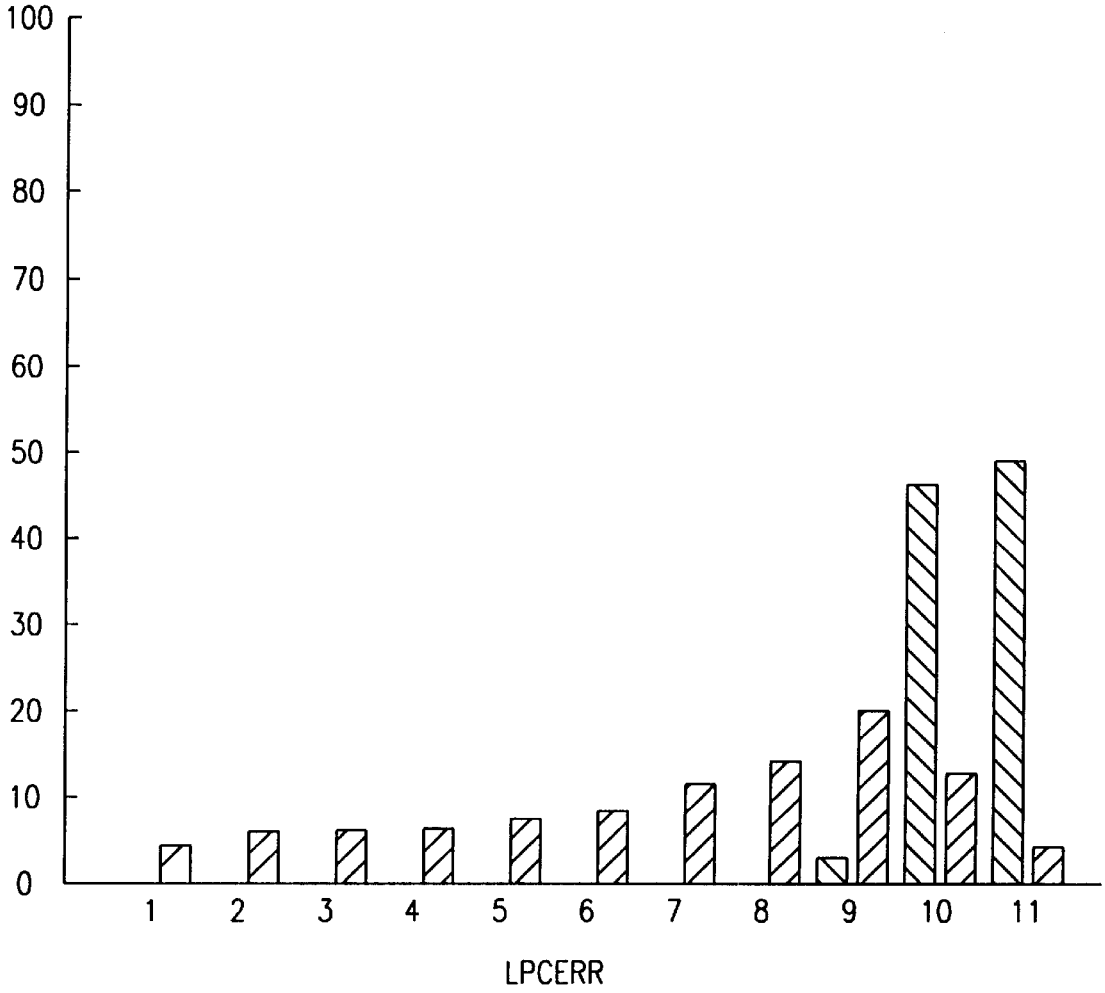

For voiced speech, g has a larger values than for unvoiced speech. The performance of this feature is demonstrated in FIG. 19 with helicopter noise and in FIG. 20 without helicopter noise. For voiced speech, the distributions concentrate mainly at bins 10 and 11. For unvoiced speech, the distributions are scattered throughout all bins but with very little overlap with voiced bins. Thus, this feature is also suitable for enhancing voicing decisions.

Figure 5:
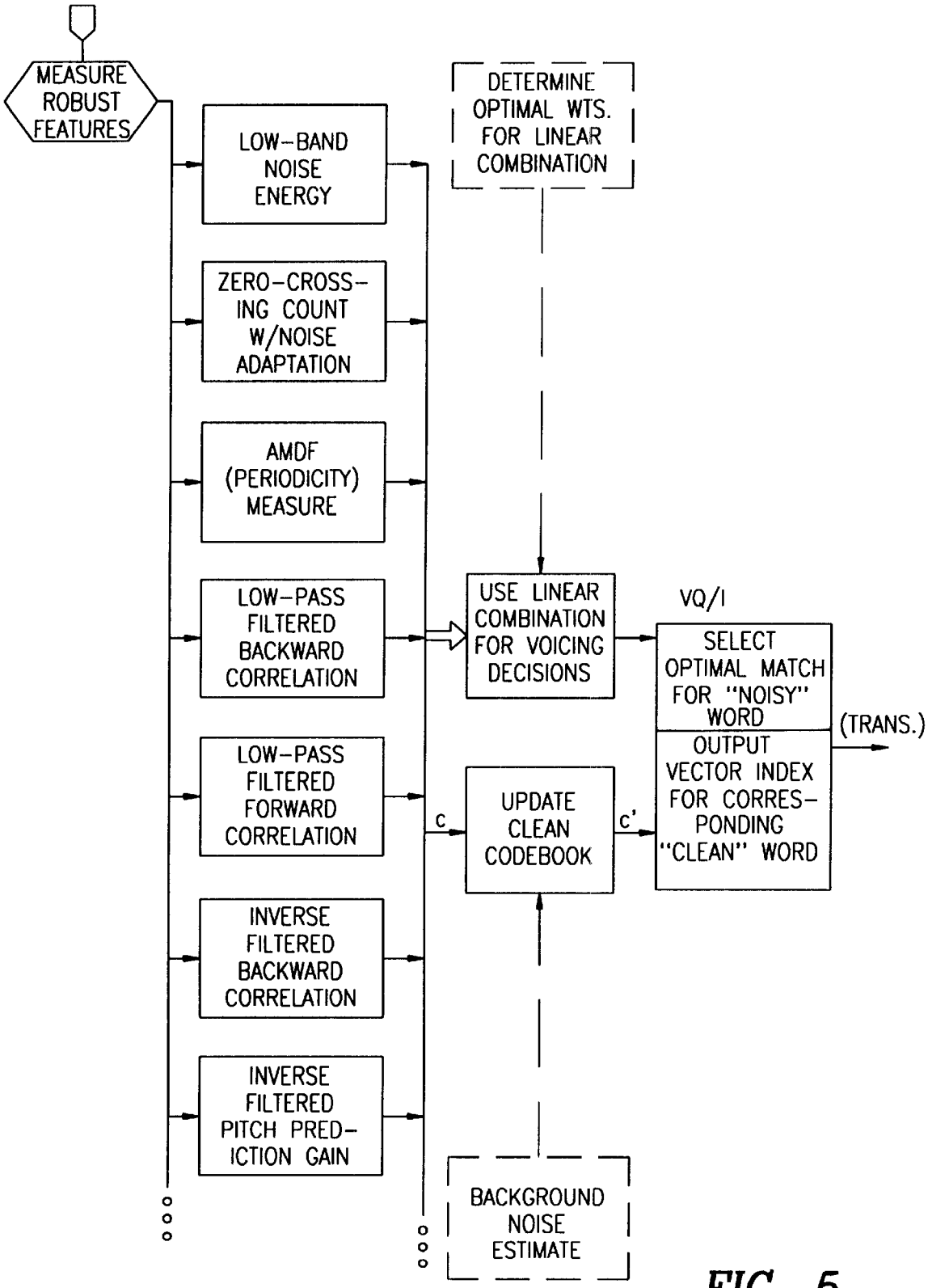
FIG. 5 is a block diagram of the steps for performing the robust feature extraction, voicing decisions, noise estimation, and updating of a noisy codebook in accordance with the invention.

All of the seven features discussed above are found to have good discriminations and robust distributions. Further information on the features can be found in the references, "Voices/Unvoiced Classification of Speech with Applications to the U.S. Government LPC-10E Algorithm" by J. Campbell and T. Tremain, ICASSP'86 and "An Enhanced LPC Vocoder with No Voiced/Unvoiced Switch" by S. Y. Kwon and A. J. Goldberg, ASSP-32, 1984. Other robust features may be found using the same criteria. The histogram plots show the there are always some overlaps between voiced bins and unvoiced bins for all features. Therefore, no single feature should be relied upon to make voicing decisions. To minimize potential error, a combination of the features is utilized, as depicted in FIG. 5. A frame may be classified as being voiced if the following inequality of feature combination holds:

$$\Sigma w_j f_j > c,$$

where $f_j$ represents the jth feature, w represents a weight assigned to the feature, and c is a constant. A frame is classified as unvoiced if the reverse inequality holds. The optimum weights for the combination are determined using linear programming analysis of representative training patterns in which helicopter noise is mixed with clean speech. The correct voicing decisions are measured against LPC analysis of the clean speech. The linear programming analysis solves the inequality equations using the well-known simplex method of linear optimization by first converting them to equalities using slack and surplus variables:

$$\sum_{j=1}^{n} = f_{ij}w_j + w_{n+i} = ci = l, k$$

$$\sum_{j=1}^{n} = f_{ij}w_j - w_{n+i} = ci = k + l, k + m$$

The above equations are solved by maximizing a quantity h. A hyperplane is found separating the voiced region from the unvoiced region, and h is defined to be the average distance between the voiced region and the unvoiced region, given as follows:

$$h = \sum_{j=1}^{n} \left[\left(\frac{1}{m}\sum_{i=k+1}^{k+m} f_{ij}\right) - \left(\frac{1}{k}\sum_{i=1}^{k} f_{ij}\right)\right] w_j$$

The optimum weights are found when h is maximized for the training patterns.

The simplex method starts with an initial feasible solution. However, an initial solution is difficult to find if the number of equations becomes large. To simplify the initial solution, some artificial values are introduced, and the basic equations become as follows:

$$\sum_{j=1}^{n} = f_{ij}w_j + w_{n+i} = ci = l, k$$

$$\sum_{j=1}^{n} = f_{ij}w_j - w_{n+i} + w_{n+m+i} = ci = k + l.k + m$$

where the weights $w_j$, j=n+m+k+1, . . . n+k+2m are artificial variables. All the artificial variables are also assigned the negative maximum weight. The quantity h is then given below:

$$h = \sum_{j=1}^{n} \left[\left(\frac{1}{m}\sum_{i=k+1}^{k+m} f_{ij}\right) - \left(\frac{1}{k}\sum_{i=1}^{k} f_{ij}\right)\right] w_j - \sum_{i=1}^{m} M w_{n+i+m+l}$$

where M is an arbitrarily large number. The solutions are then iterated until all artificial variables are removed and the quantity h can no longer be increased. For a further discussion of this type of linear programming analysis, reference is made to "A Procedure For Using Pattern Classification Techniques To Obtain A Voiced/Unvoiced Classifier", by L. Siegel, IEEE Trans., ASSP-27, February 1979, and *Linear Programming,* by G. Hadley, published by Addison Wesley, 1963.

Analyses performed by the above-described procedures showed that the five most useful features for the helicopter-noise patterns are low-band energy, zero-crossing rate, AMDF measure, low-pass filtered backward correlation, and inverse-filtered pitch-prediction gain. Therefore, these five features are combined in this example to make decisions as to when the input speech frames are voiced or unvoiced. Voicing smoothing may also be used to desensitize the voicing decisions to rapid transitions in values. Factors considered in smoothing include the discriminant magnitude of the voiced/unvoiced decisions, the onset of a rapid transition (between half frames), and continuity (which requires no instantaneous change of voicing). The voicing is determined every half frame of 11.25 msec. In order to facilitate the smoothing decisions, the final voicing decisions may be delayed two frames.

Referring again to FIG. 5, vector quantization (VQ/I module) is used to quantize the speech-feature vector for each frame. A codebook C has a vocabulary of model feature vectors mapped to the corresponding codeword indices in a low number of bits. For each input vector, the distortion from each model vector in the codebook is computed. The index of the word having the minimum distortion is then selected for transmission. For a 10-bit codebook used in the study, voiced codewords have indices ranging from 0 to 991 and unvoiced codewords have indices ranging from 992 to 1023. If the codebook is designed in the same environment as the input speech, the optimal speech reproduction can be expected. However, if the codebook is designed in a quiet background while the input speech comes from a noisy environment, selection of the optimum word becomes difficult. Noise cancellation is one conventional technique to remove the background noise from the input speech. However, if not done properly, spectral distortion is also introduced. To overcome this drawback, adaptive vector quantization is used in the present invention. This refers to the updating of the original codebook C based upon an estimate of the background noise level to generate a "noisy" codebook C'. The noisy codebook C' is searched to find the best match with the input vector, then the index for the corresponding clean codeword is selected for transmission, and is also used at the receiver end for synthesis.

A background noise estimate can be performed in two One is the average noise amplitude $N^a_i$, and the other is the average noise reflection coefficients $B^a_{ij}$, j=1, . . . P, where i represents the current frame number, j represents the coefficient number, and P is the LPC order. To prevent using voiced or unvoiced speech in the computation, the noise estimate for frame i is only performed if two conditions are satisfied: the frame i is decided to be unvoiced; and there must be an accumulation of more than a given number L of continuous unvoiced frames. To count continuous unvoiced frames, a counter n is reset on each voiced frame and incremented on each unvoiced frame. For n>L, the following noise estimates are computed:

$$N_i^a=(63/64)N_i^a+(1/64)E_{i-15)}$$

$$B^a_{ij=}(63/64)B^a_{ij}=(63/64)B^a_{ij}+(1/64)B_{(i-15)j}\ j=1,P$$

The average noise reflection coefficients $B^a$ are further converted to noise autocorrelation coefficients $R^N$. To compute $R^N$ and $N^a$ at frame i, the values at frame i-15 are utilized. This greatly reduces the probability of including speech frames. The noise estimate parameters $R^N$ and $N^a$ are then used to add noise parameters to the codebook vectors.

The LSFs are converted to autocorrelation coefficients for each codeword in the clean codebook. As described previously, the higher-order LPC vector can enhance discrimination of the formants in noise, and the codebook is preferably designed using a 14th-order LPC analysis, i.e. P=14. Assuming there are N codewords in the codebook, and each codeword has P autocorrelation coefficients, and $R^C_{kj}$ represents the jth coefficient of the kth codeword, then the noise autocorrelation coefficients are added to each codeword as follows:

$$R^C_{ij} = \frac{R^C_{ij} + Q_l * R^N_j}{Q_l + 1} \quad j = 1, P, \quad k = 1, N$$

where $R^C_{kj}$ represents the updated codeword vector and $Q_i$ represents the mixing ratio at the ith frame. The mixing ratio is determined from the noise amplitude $N^a_i$, as follows:

$$Q_i=(N^a_i{}^*f/70)^2$$

where f is a factor determined empirically, according to the level of noise amplitude, as follows:

$$f=1.5, \text{ for } N^a_i<10$$

$$f=1.2, \text{ for } 10<N^a_i<24$$

$$f=1.0, \text{ for } N^a_i>24$$

The codebook update is performed only when the counter n is at a multiple factor of J frames, which is adjustable depending upon the processor speed. For a very fast processor, the codebook could be updated every frame. In this case, the mixing ratio $Q_i$ is determined empirically to depend upon the signal-to-noise ratio, as follows:

$$Q_i=(N^a_i/S_i)^2$$

where $S_i$ represents the speech amplitude at frame i. This mixing ratio is used in the same way as described above to compute the updated codewords.

After computing the updated codebook of autocorrelation coefficients, each codeword is further converted to line-spectrum frequencies (LSFs) and formants. The input reflection coefficients are also converted to LSFs and formants. For the 14th-order LPC analysis, each vector for a voiced frame consists of 14 LSFs and two lowest frequency formants, and each vector for an unvoiced frame consists of 14 LSFs and one highest frequency formant. The N codewords of the codebook are then searched to find the codeword which has the best match with an input vector, and the corresponding index is transmitted to the receiver.

In the receiver, only the clean codebook of N codewords is stored. The received index is used to select the corresponding clean codeword for synthesis. Thus, even though an updated (noisy) codebook is used to produce better matching, a clean codebook is used for synthesis of output speech in which spectral distortion is greatly reduced.

Figure 21:
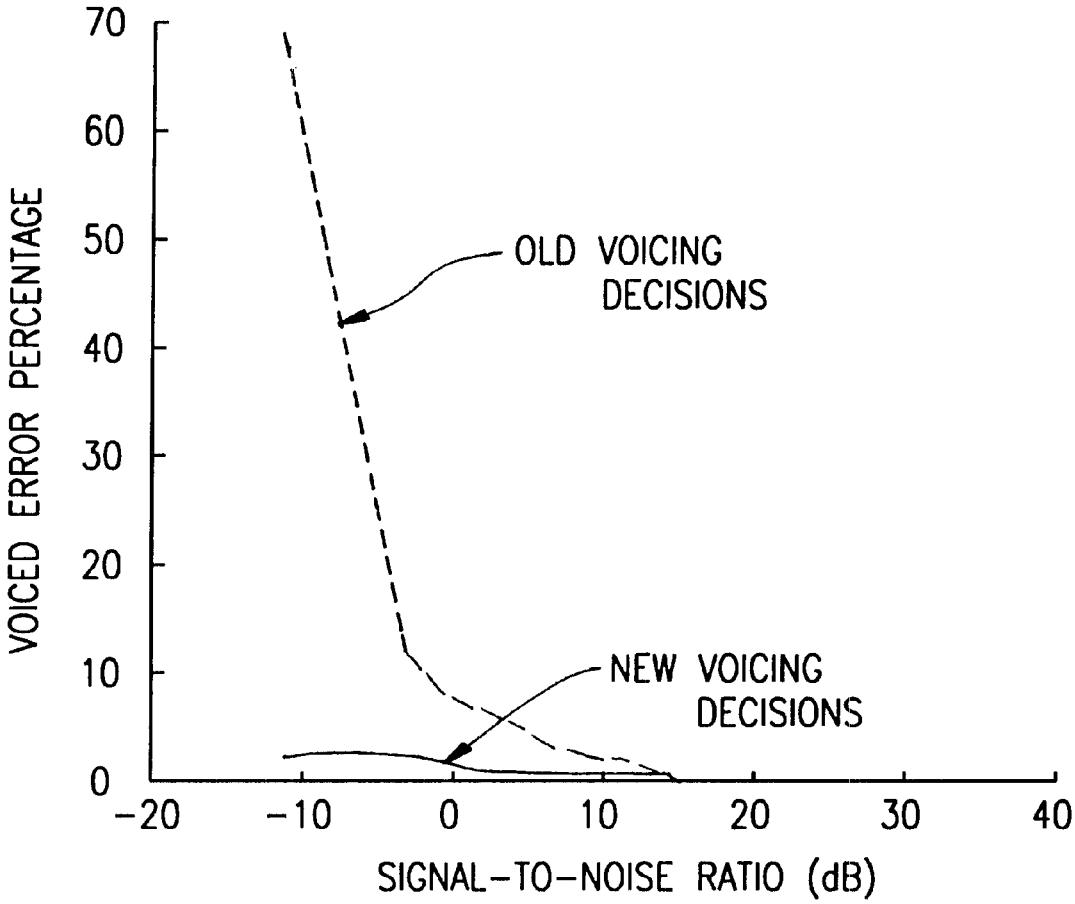
FIG. 21 is a plot of the voiced error percentage for voicing decisions obtained by the enhanced encoding techniques of the present invention as compared to the prior encoding method.

The previous speech coder techniques as described in U.S. Pat. No. 4,975,956 could be implemented for 400-bps transmission using a 100 nsec DSP processor (equivalent to 10 Mips). The enhanced techniques can be implemented using two such DSPs, if tree searching for codeword matches and 32-frame codebook updates are used. Using the voicing decisions from LPC analysis of clean speech via the prior techniques as a reference, the performance of the new voicing decision techniques is illustrated in FIG. 21 as a plot of error percentage versus signal-to-noise ratio by neglecting those frames with gain less than 5 in the quiet background. For the reference plot of the old voicing decisions, the error percentage is zero at a signal-to-noise ratio of 30 dB. However, the error percentage climbs abruptly to 66% at a signal-to-noise ratio of −10 dB. Using the new voicing decision techniques, the error percentage increases only about 1% as the signal-to-noise ratio drops from 30 dB to −10 dB. If all voiced frames are considered regardless of gain, the error percentage increases from about 2% at S/N of 30 dB to 6% at S/N of −10 dB. For unvoiced frames, the robustness remains about the same. The superiority of the enhanced speech coding techniques is thus clearly demonstrated.

Informal listening tests were also conducted both for speech samples in which noise was mixed with clean speech and those recorded in the actual helicopter noise environment. The listening tests showed none of the previous whispering LPC speech for either type of sample. The 400-bps speech in the noisy environment was reproduced as clearly audible but with some degradation in quality. To improve speech intelligibility, improved vector quantization can be applied.

The adaptive vector quantization was also tested using noisy speech samples of the same two types. The listening tests showed that there is always an intelligibility improvement using codebook adaptation. The degree of improvement depends upon three factors: signal-to-noise ratio; rate of codebook update; and the use of preemphasis. Tests on the effect of S/N ratio showed that the intelligibility improvement is quite significant at very low S/N such as −10 dB. for higher S/N, the improvement is less audible, which is expected since there is less noise corruption. The intelligibility improvement seems to depend only a little on the rate of codebook update. Updating with every frame appeared only slightly better than updating every 32 frames. As to preemphasis, tests of mixed speech showed that the same factor as used in the clean codebook should be used, whereas for recorded speech, a smaller preemphasis factor can significantly improve intelligibility.

The specific embodiments of the invention described herein are intended to be illustrative only, and many other variations and modifications may be made thereto in accordance with the principles of the invention. All such embodiments and variations and modifications thereof are considered to be within the scope of the invention, as defined in the following claims.

I claim:

1. In a method of low-bit-rate speech coding of input speech occurring in a noisy environment, for a system which employs linear predictive coding (LPC) analysis of input speech frames to generate reflection coefficients, conversion of the reflection coefficients to vectors representing spectral parameters of the input speech frames, and matching of the spectral parameter vectors against reference vectors of a vocabulary of codewords generated in a training sequence in order to select the corresponding index of an optimally matching codeword for transmission, the improvement comprising the steps of:

selecting a set of at least two features which are characterized by a probability distribution which is not strongly affected in the noisy environment and which allow discrimination between voiced and unvoiced input speech, wherein said selected features include the feature of zero-crossing counts which are based on average noise energy;

measuring the selected features for input speech frames; and using said feature measurements to make voiced/unvoiced speech decisions in order to select the voice/unvoiced excitation for speech synthesis in the receiver;

using noise estimates to update the reference vectors of the vocabulary of codewords, wherein new reference vectors are generated corresponding to said vocabulary of codewords in the noisy environment, said noise estimates including noise amplitude and noise reflection coefficients, wherein said noise estimate for speech frame I is performed only if the ith speech frame is unvoiced and more than a given number L of continuous unvoiced speech frames are accumulated, in order to prevent using voiced or unvoiced speech in the noise estimate.

2. A low-bit-rate speech coding method according to claim 1, wherein said voicing decision step includes the substep of determining a linear combination of said features which provides a high voiced/unvoiced discrimination capability; and determining respective weights to be applied to said features in order to obtain an optimal linear combination of said features.

3. A low-bit-rate speech coding method according to claim 2, wherein said weights determining substep of said voicing decision step is performed using the simplex method for obtaining a maximum quantity h for an average distance between voiced and unvoiced regions of the input speech.

4. A low-bit-rate speech coding method according to claim 1, wherein said selected features include the feature of low-band energy.

5. A low-bit-rate speech coding method according to claim 1, wherein said selected features include an AMDF ratio (speech periodicity) measure.

6. A low-bit-rate speech coding method according to claim 1, wherein said selected features include a backward correlations measure responsive to low-pass-filtered speech energy.

7. A low-bit-rate speech coding method according to claim 1, wherein said selected features include a forward correlations measure responsive to low-pass-filtered speech energy.

8. A low-bit-rate speech coding method according to claim 1, wherein said selected features include a backward correlations measure responsive to inverse-filtered speech energy.

9. A low-bit-rate speech coding method according to claim 1, wherein said selected features include a pitch prediction gain measure responsive to inverse-filtered speech energy.

10. A low-bit-rate speech coding method according to claim 1, adapted for the environment of helicopter noise, and further comprising the step of low-pass filtering of speech energy at a cutoff frequency of about 420 Hz.

11. A low-bit-rate speech coding method according to claim 10, wherein said LPC analysis is conducted as 14th-order LPC analysis.

12. In a method of low-bit-rate speech coding of input speech occurring in a noisy environment, for a system which employs linear predictive coding (LPC) analysis of input speech frames to generate reflection coefficients, conversion of the reflection coefficients to vectors representing spectral parameters of the input speech frames, and matching of the spectral parameter vectors against reference vectors of a vocabulary of codewords generated in a training sequence in order to select the corresponding index of an optimally matching codeword for transmission, the improvement comprising the steps of:

selecting a set of features which are characterized by a probability distribution which is not strongly affected in the noisy environment and which allow discrimination between voiced and unvoiced input speech;

measuring the selected features for input speech frames; and using said feature measurements to make voiced/unvoiced speech decisions in order to select the voice/unvoiced excitation for speech synthesis in the receiver;

using noise estimates to update the reference vectors of the vocabulary of codewords, wherein new reference vectors are generated corresponding to said vocabulary of codewords in the noisy environment, said noise estimates including noise amplitude and noise reflection coefficients, wherein said noise estimate for speech frame I is performed only if the ith speech frame is unvoiced and more than a given number L of continuous unvoiced speech frames are accumulated, in order to prevent using voiced or unvoiced speech in the noise estimate.

13. A low-bit-rate speech coding method according to claim 12, wherein the vocabulary of codewords is generated for speech in a quiet environment, said quiet environment vocabulary is updated with noise estimates to obtain a vocabulary of codewords corresponding to the noisy environment, said noisy environment vocabulary constituting said reference vectors against which said spectral parameter vectors are matched, and speech is synthesized at a received end of the speech coding system using said quiet environment vocabulary.

*14. A method for speech coding for transmission comprising:*

*providing a first vector quantization codebook of reference vectors, each reference vector representing spectral characteristics of a corresponding time frame of a reference speech signal;*

*accepting an input audio signal;*

*updating the reference vectors of the first vector quantization codebook to produce a corresponding second*

*vector quantization codebook, including updating each reference vector to represent spectral characteristics of a combination of the corresponding time frame of the reference speech signal and a background noise present in the input audio signal; and*

*quantizing a time frame of the input audio signal according to the second vector quantization codebook, selecting the most similar updated reference vector to spectral characteristics of said time frame of the input audio signal.*

*15. The method of claim 14 further comprising:*

*transmitting an index of a reference vector of the first vector quantization codebook that corresponds to the selected updated reference vector of the second vector quantization codebook;*

*receiving the transmitted index; and*

*synthesizing a time frame of an output signal, including selecting a reference vector of the first vector quantization codebook according to the received index.*

*16. The method of claim 14 further comprising estimating a characteristic of the background noise present in the input audio signal.*

*17. The method of claim 16 further comprising repeating the steps of estimating the background noise of the input audio signal, updating the reference vectors of the first vector quantization codebook and quantizing the input signal according to the second vector quantization codebook for each of a sequence of time frames of the input audio signal.*

*18. The method of claim 16 wherein estimating a characteristic of the background noise includes:*

*determining any of a consecutive series of a predetermined number of time frames of the input audio signal includes voiced speech; and*

*if none of the series of time frames includes voiced speech, estimating the characteristic of the background noise in at least one of said series of time frames.*

*19. The method of claim 18 wherein estimating the characteristic of the background noise in at least one of said series of time frames includes determining an average noise amplitude in said time frame.*

*20. The method of claim 18 wherein estimating the characteristic of the background noise in at least one of said series of time frames includes determining a spectral representation of the background noise.*

*21. The method of claim 20 wherein determining the spectral representation of the background noise includes determining autocorrelation coefficients of the background noise.*

*22. The method of claim 16 wherein:*

*estimating the characteristic of the background noise includes determining autocorrelation coefficients of the background noise; and*

*updating each reference vector includes determining an autocorrelation coefficient representation of the spectral characteristics associated with the reference vector, and combining said autocorrelation coefficients with the autocorrelation coefficients of the background noise to produce an autocorrelation coefficient representation of the spectral characteristics represented by the updated reference vector.*

*23. The method of claim 22 wherein updating each reference vector further includes computing a line spectral frequency (LSF) representation from the autocorrelation coefficients associated with each of the updated reference vectors, and quantizing the time frame of the input audio signal includes comparing a LSF representation of the time frame of the input signal with the LSF representation of the updated reference vectors.*

*24. A speech encoder comprising:*

*an input processor for accepting and input audio signal;*

*a background noise estimator coupled to the input processor for estimating a characteristic of a background noise present in the input audio signal;*

*a first vector quantization codebook including reference vectors, each reference vector representing spectral characteristics of a corresponding time frame of a reference speech signal;*

*a second vector quantization codebook of updated reference vectors, each updated reference vector corresponding to a different one of the reference vectors of the first vector quantization codebook, and each reference vector representing spectral characteristics of a combination of the corresponding time frame of the reference speech signal and the background noise present in the input audio signal;*

*a codebook updater coupled to the first vector quantization codebook, the background noise estimator, and the second vector quantization codebook, configured to accept reference vectors of the first vector quantization codebook and the characteristic of the background noise and produce the reference vectors of the second vector quantization codebook;*

*a vector quantizer coupled to the second quantization codebook and the input processor configured to quantize a time frame of the input audio signal according to the second vector quantization codebook by selecting the most similar reference vector of said second codebook to spectral characteristics of said time frame of the input audio signal; and*

*a transmitter coupled to the vector quantizer to sending an index of the reference vector of the first vector quantization codebook that corresponds to the selected most similar reference vector of the second vector quantization codebook.*

* * * * *